United States Patent
Yun et al.

(10) Patent No.: US 10,225,463 B2
(45) Date of Patent: Mar. 5, 2019

(54) MOBILE TERMINAL UPLOADING VIDEO IN A PLURALITY OF FORMATS AND CONTROLLING METHOD THEREOF

(71) Applicant: LG ELECTRONICS INC., Seoul (KR)

(72) Inventors: Jiwon Yun, Seoul (KR); Minah Song, Seoul (KR); Kyungmin Cho, Seoul (KR); Chansoo Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/218,875

(22) Filed: Jul. 25, 2016

(65) Prior Publication Data

US 2017/0070669 A1 Mar. 9, 2017

(30) Foreign Application Priority Data

Sep. 8, 2015 (KR) .......................... 10-2015-0126915

(51) Int. Cl.
*H04N 5/232* (2006.01)
*G11B 27/34* (2006.01)
*G06Q 50/00* (2012.01)
*H04M 1/725* (2006.01)
*H04L 29/08* (2006.01)
*G11B 20/10* (2006.01)
*H04W 88/02* (2009.01)

(52) U.S. Cl.
CPC ......... *H04N 5/23222* (2013.01); *G06Q 50/01* (2013.01); *G11B 27/34* (2013.01); *H04L 67/06* (2013.01); *H04M 1/72519* (2013.01); *H04N 5/23216* (2013.01); *H04N 5/23293* (2013.01); *G11B 20/10* (2013.01); *H04M 2250/22* (2013.01); *H04M 2250/52* (2013.01); *H04W 88/02* (2013.01)

(58) Field of Classification Search
CPC .... H04L 67/06; G06Q 50/01; H04N 5/23222; H04M 1/72519
See application file for complete search history.

(56) References Cited

U.S. PATENT DOCUMENTS

| | | | |
|---|---|---|---|
| 2008/0307475 A1* | 12/2008 | Liwerant | H04M 3/567 725/109 |
| 2011/0032979 A1 | 2/2011 | Matsuo et al. | |
| 2013/0227087 A1 | 8/2013 | Park et al. | |
| 2014/0094220 A1* | 4/2014 | Dey | H04M 1/0264 455/556.1 |
| 2015/0029382 A1 | 1/2015 | Chun et al. | |
| 2015/0205457 A1 | 7/2015 | Woo et al. | |
| 2016/0294799 A1* | 10/2016 | Miller | H04N 21/4788 |

* cited by examiner

*Primary Examiner* — Christopher K Peterson
(74) *Attorney, Agent, or Firm* — Birch, Stewart, Kolasch & Birch, LLP

(57) ABSTRACT

A mobile terminal including a wireless communication processor configured to wireless communicate with a video upload service; a camera; a touchscreen configured to display a preview image received from the camera; and a controller configured to when the image received from the camera starts to be recorded into a video, control the video to be recorded to meet a video upload requirement of the video upload service, and upload the recorded video to the video upload service via the wireless communication processor.

10 Claims, 31 Drawing Sheets

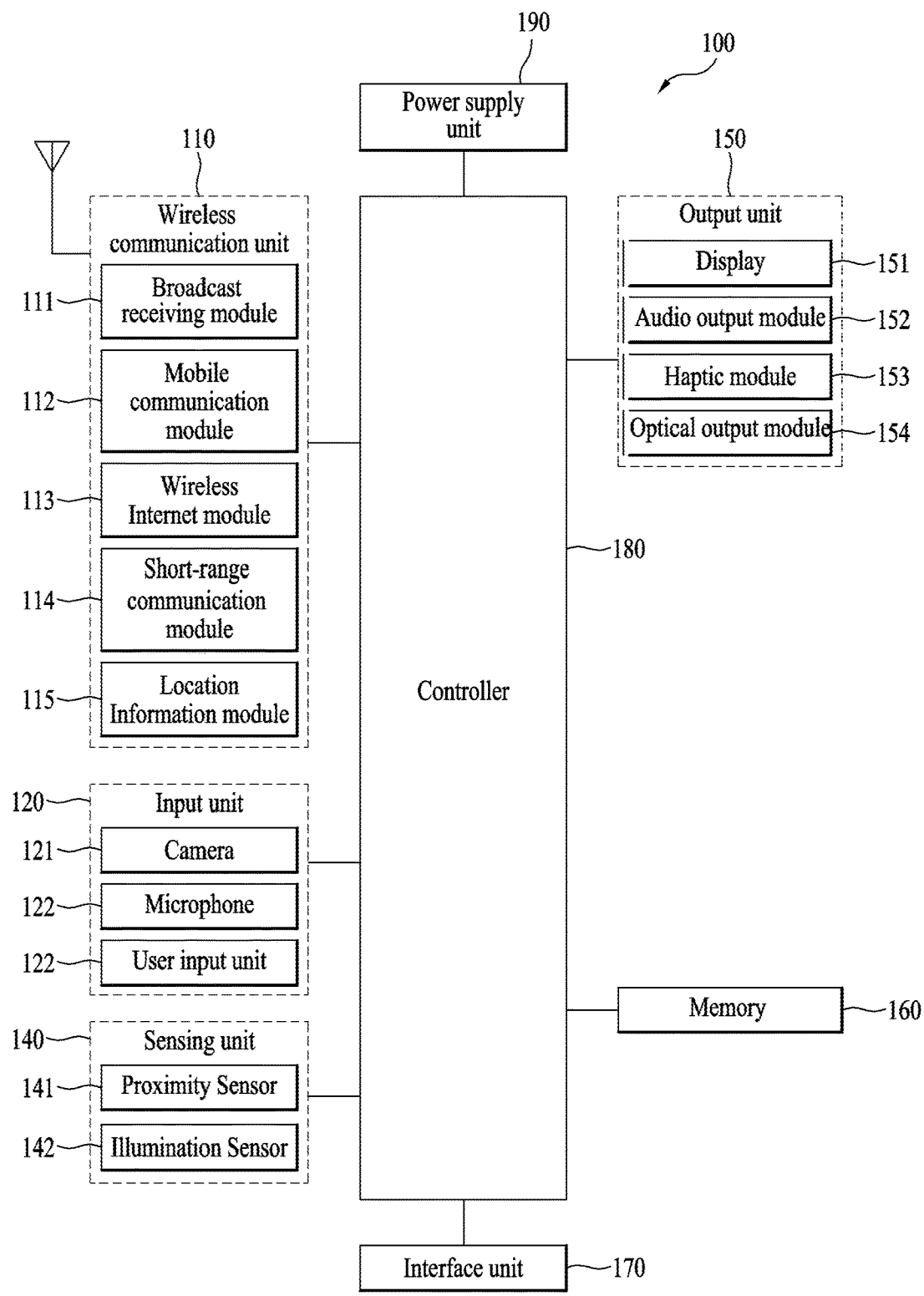

(a)

(b)

(a)

(b)

(a)

(b)

(a)

(b)

(a)

(b)

(a)

(b)

(a)

(b)

(a)

(b)

(a)

(b)

MOBILE TERMINAL UPLOADING VIDEO IN A PLURALITY OF FORMATS AND CONTROLLING METHOD THEREOF

Pursuant to 35 U.S.C. § 119(a), this application claims the benefit of earlier filing date and right of priority to Korean Application No. 10-2015-0126915, filed on Sep. 8, 2015, the contents of which are hereby incorporated by reference herein in their entirety.

BACKGROUND OF THE INVENTION

Field of the Invention

The present invention relates to a mobile terminal, and more particularly, to a mobile terminal and a method of controlling the mobile terminal.

Discussion of the Related Art

A mobile terminal is a device which may be configured to perform various functions. Examples of such functions include data and voice communications, capturing images and video via a camera, recording audio, playing music files and outputting music via a speaker system, and displaying images and video on a display.

Generally, terminals can be classified into mobile terminals and stationary terminals according to a presence or non-presence of mobility. And, the mobile terminals can be further classified into handheld terminals and vehicle mounted terminals. There are ongoing efforts to support and increase the functionality of mobile terminals Such efforts include software and hardware improvements, as well as changes and improvements in the structural components which form the mobile terminal.

The means for an individual to establish a social relation has evolved gradually together with the development of the communication technology. Particularly, the medium 'web' forms a network through PC to have the feature of interactivity anywhere and at anytime, thereby playing a role as a medium in solving the problems of time and place limitations put on previous mediums or media.

Thus, owing to the ongoing development of the internet technology, as a service for providing a communication, which is a service of allowing an individual to have relations with other people in a virtual space on the Internet and to share various information, the social networking service (hereinafter abbreviated SNS) is currently used. Also, the representative types of the SNS include Instagram, Facebook, Twitter and the like.

In addition, a user installs a use-desired SNS application on their terminal, creates an online account by accessing an SNS site through the SNS application, and can then upload such contents as texts, images, videos, songs and the like to the created account in order to share the contents with subscribers of the SNS. However, since each SNS company has different video upload requirements for a video upload service provided by the corresponding SNS company, if a user is not aware of the video upload requirements requested by a corresponding SNS company, it may a cause problem that the user frequently fails in uploading a desired video to be shared to SNS.

For instance, according to the video upload requirements by Instagram, if a play time of a video to be uploaded exceeds 15 seconds, the upload of the video is restricted. Hence, when a user is not aware of the video upload requirements by Instagram, if the user records a video having a play time over 16 seconds by real time through a camera of the user and then attempts to upload the recorded video to Instagram, the user fails in uploading the corresponding video.

SUMMARY OF THE INVENTION

Accordingly, the present invention is directed to a mobile terminal that substantially obviates one or more problems due to limitations and disadvantages of the related art.

One object of the present invention is to provide a mobile terminal and controlling method thereof, by which a video is uploaded to a user account of SNS by recording the video to meet a video upload requirement requested by the SNS in recording the video through a camera to upload the video to at least one SNS and then uploading the recorded video.

Another object of the present invention is to provide a mobile terminal and controlling method thereof, by which a video is uploaded to a user account of SNS by completing a video recording through a camera, selecting the SNS to upload the recorded video, converting the recorded video to meet a video upload requirement requested by the SNS, and then uploading the converted video to the user account.

Technical tasks obtainable from the present invention are non-limited by the above-mentioned technical tasks. And, other unmentioned technical tasks can be clearly understood from the following description by those having ordinary skill in the technical field to which the present invention pertains.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to an embodiment of the present invention includes a camera, a touchscreen configured to display a preview screen including an image received from the camera, a controller configured to, when the image received from the camera starts to be recorded into a video, control the video to be recorded to meet a video upload requirement of at least one preset video upload service and control the recorded video to be uploaded via the video upload service.

In another aspect of the present invention, a method of controlling a mobile terminal according to an embodiment of the present invention includes displaying a preview screen including an image received from a camera, initiating a recording of the image received from the camera into a video, recording the video to meet a video upload requirement of at least one preset video upload service, uploading the recorded video via the video upload service.

In further aspect of the present invention, a mobile terminal according to an embodiment of the present invention includes a camera configured for a video recording, a touch screen configured to display a video currently recorded through the camera on a screen, a controller configured to, when the recording of the video is completed, display at least one item indicating at least one video upload service can be provided in the mobile terminal, the controller configured to, when the item is selected, convert the recording completed video to meet a video upload requirement of the video upload service corresponding to the selected item, and control the converted video to be uploaded through the video upload service.

In another further aspect of the present invention, a method of controlling a mobile terminal according to an embodiment of the present invention includes initiating a recording of a video via a camera, displaying the recording initiated video on a screen, when the recording of the video is completed, displaying at least one item indicating at least one video upload service can be provided in the mobile terminal, when the item is selected, converting the recording completed video to meet a video upload requirement of the video upload service corresponding to the selected item, uploading the converted video through the video upload service.

Effects and/or advantages obtainable from the present invention are non-limited the above mentioned effect. In addition, other unmentioned effects and/or advantages can be clearly understood from the following description by those having ordinary skill in the technical field to which the present invention pertains. It is to be understood that both the foregoing general description and the following detailed description of the present invention are exemplary and explanatory and are intended to provide further explanation of the invention as claimed.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by illustration only, and thus are not limitative of the present invention, and wherein:

FIG. 1A is a block diagram illustrating a mobile terminal related to the present invention;

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Although the terms first, second, etc. may be used herein to describe various elements, these elements should not be limited by these terms. These terms are generally only used to distinguish one element from another. When an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
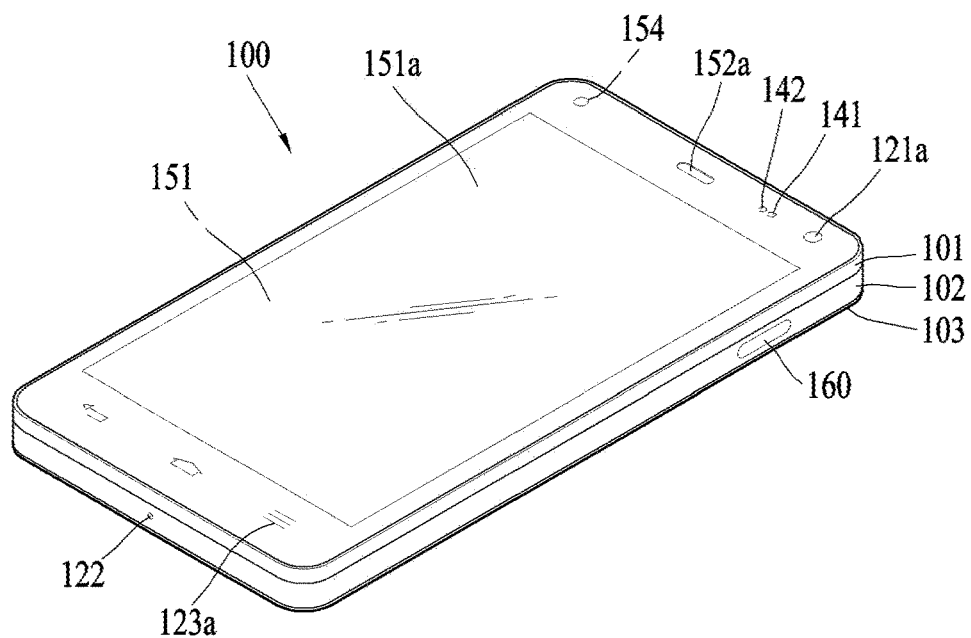
FIG. 1B and FIG. 1C are conceptual diagrams illustrating one example of a mobile terminal related to the present invention viewed in different directions, respectively.
Figure 1C:
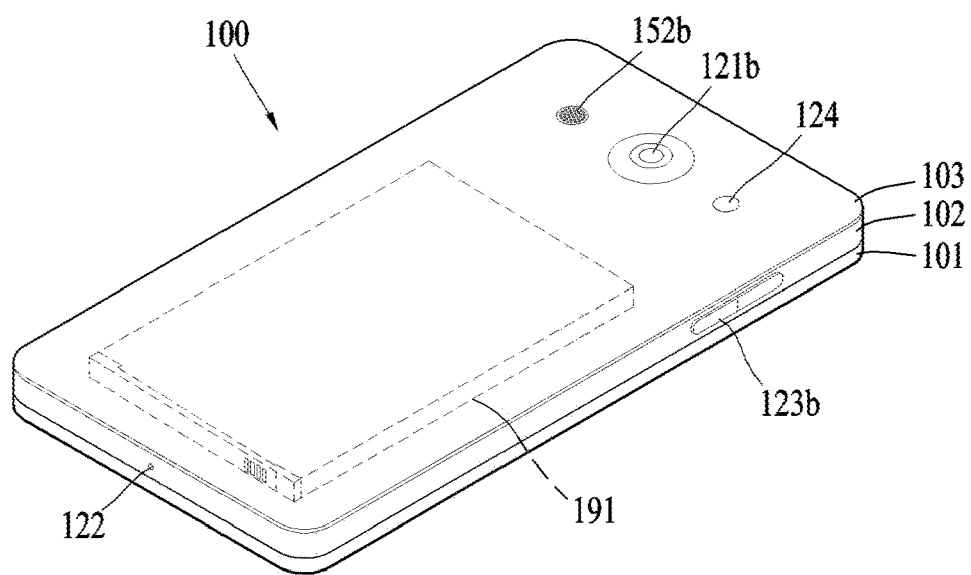

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions. The mobile terminal 100 is shown having components such as a wireless communication unit 110, an input unit 120, a sensing unit 140, an output unit 150, an interface unit 160, a memory 170, a controller 180, and a power supply unit 190. Implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 can provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies. Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which can exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. Further, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this instance, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others. As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 can sense which region of the display unit 151 has been touched. Here, the touch controller may be a component separate from the controller 180, the controller 180, and combinations thereof.

In some embodiments, the controller 180 can execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor. Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented so the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen. The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 can typically control the general operations of the mobile terminal 100. For example, the controller 180 can set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected. As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance. Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101. In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like. As an alternative to the example in which the plurality of cases form an inner space for accommodating components, the mobile terminal 100 may be configured such that one case forms the inner space. In this example, a mobile terminal 100 having a uni-body is formed so synthetic resin or metal extends from a side surface to a rear surface.

If desired, the mobile terminal 100 may include a waterproofing unit for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like. The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this instance, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170. The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof. Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen. As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject. As shown in FIG. 1C, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

In the following description, a method of controlling the mobile terminal 100 according to an embodiment of the present invention is explained in detail with reference to FIGS. 2 to 30. In particular, according to the contents described with reference to FIGS. 2 to 28, the following function is provided. First of all, when a user of the mobile terminal 100 records a video in order to upload a video to share with family or friends to a user account of at least one video upload service, the video is recorded to meet a video upload requirement of the video upload service. Secondly, the recorded video is uploaded to the user account of the video upload service.

According to the contents described with reference to FIG. 29 and FIG. 30, the following function is provided. First of all, if a recording of a video to be shared is completed, the recording completed video is converted to meet a video upload requirement of a video upload service selected by a user. Secondly, the converted video can be uploaded to a user account of the video upload service.

In this instance, the video upload service may include a social network service that provides a video upload service to a user account of the mobile terminal. In the following description, the video upload service is assumed as SNS. Of course, a video upload service according to an embodiment of the present invention is non-limited by the SNS but includes all services capable of providing a video upload function to a subscriber.

Figure 2:
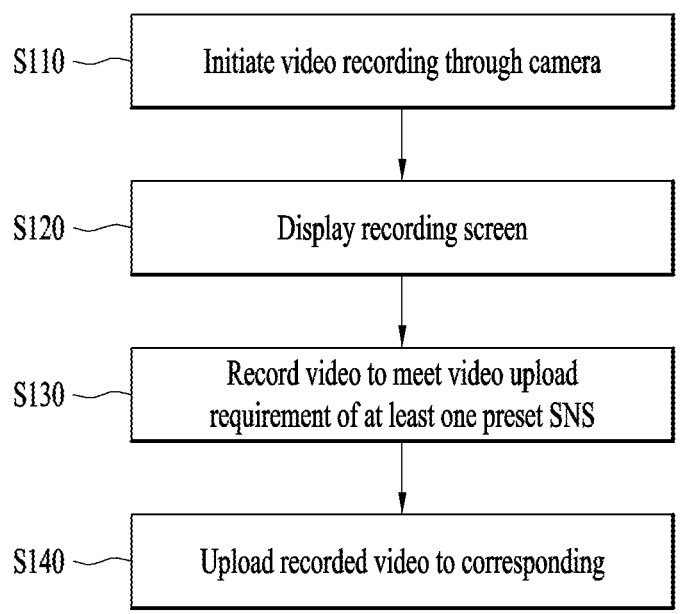
FIG. 2 is a flowchart of a process for recording a video to meet a video upload requirement of a preset SNS according to one embodiment of the present invention.

Next, with reference to FIGS. 2 to 28, described in detail is a process including recording a video to meet a video upload requirement of a preset SNS in case of recording a video and uploading the recorded video to a user account of the SNS. In particular, FIG. 2 is a flowchart for a process for recording a video to meet a video upload requirement of a preset SNS according to one embodiment of the present invention, and FIGS. 3 to 28 are diagrams to describe a process for recording a video to meet a video upload requirement of a preset SNS according to one embodiment of the present invention.

Referring to FIGS. 2 to 28, if the camera 121 is activated, the controller 180 of the mobile terminal 100 displays a preview screen, which includes an image received from the camera 121, on the touchscreen 151. Subsequently, if a video recording command is received from a user, the controller 180 initiates a recording of a video of images received from the camera 121 (S110) and displays a recording screen of the currently recorded video (S120). Thereafter, if the recording of the video starts, the controller 180 controls the video to be recorded to meet a video upload requirement of at least one preset SNS (S130).

Figure 3:
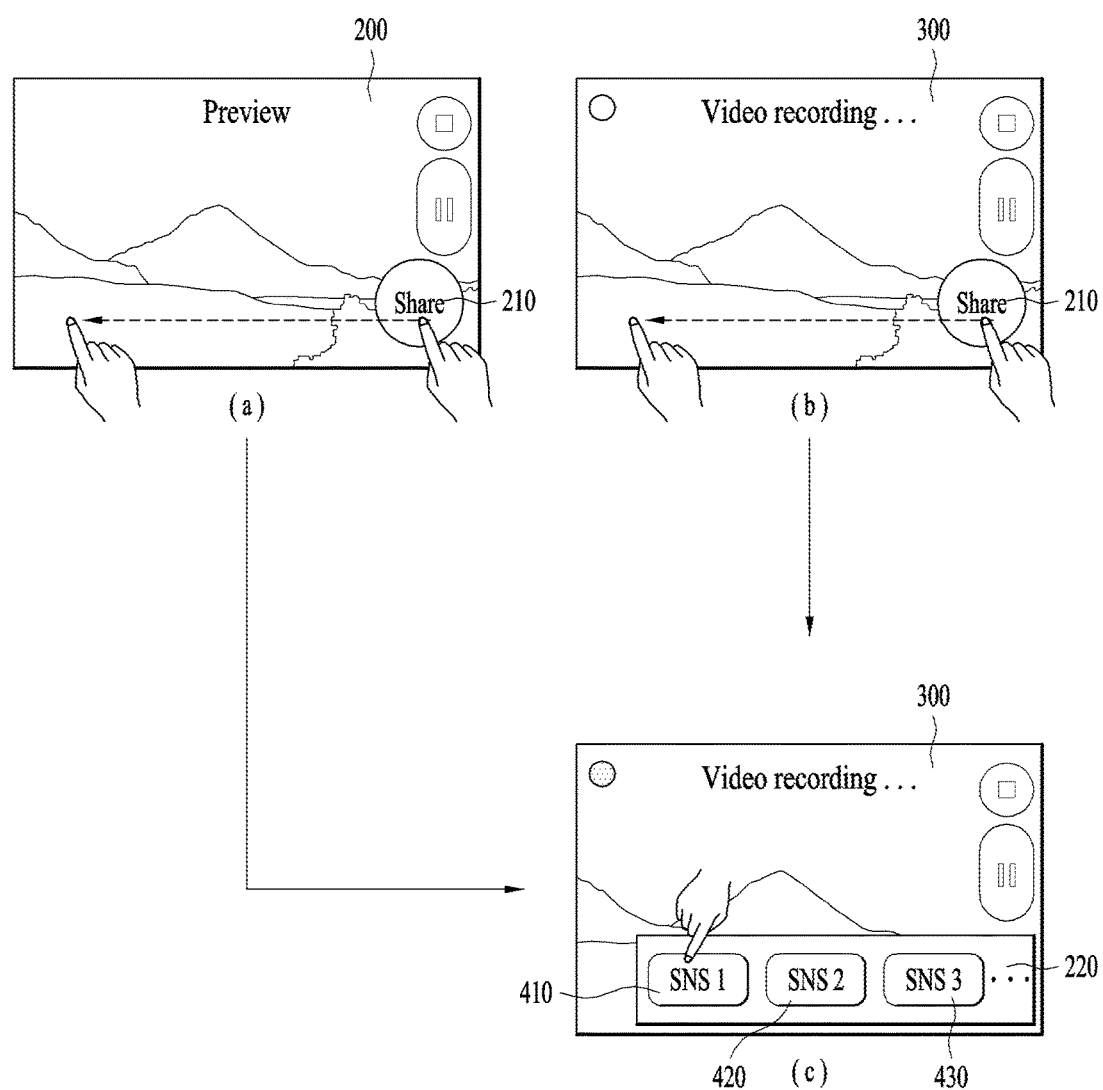
FIGS. 3 to 28 are diagrams illustrating a process for recording a video to meet a video upload requirement of a preset SNS according to one embodiment of the present invention.

A process for setting the preset SNS is described in detail with reference to FIG. 3 as follows. Referring to FIG. 3 (a), after the camera 121 has been activated, if an image received from the camera 121 is displayed as a preview screen 200 before recording a video, the controller 180 displays a share item 210 on the preview screen 200.

Referring to FIG. 3 (c), if the share item 210 is selected, the controller 180 displays items 410, 420 and 430 indicating at least one or more SNSs can be provided in the mobile terminal 100 on the preview screen 200. If a specific item 410 is selected from the displayed items 410, 420 and 430, the controller 180 starts a recording of a video through the camera 121 and records the video to meet a video upload requirement of an SNS corresponding to the selected item 410.

Further, if the share item 210 is touched and dragged in a first direction, the controller 180 can display the items 410, 420 and 430 on a region 220 corresponding to the touch & drag. Moreover, referring to FIG. 3 (b), after the camera 121 has been activated, if a recording of a video starts, the controller 180 displays a share item 210 on the preview screen 200.

Referring to FIG. 3 (c), if the share item 210 is selected, the controller 180 displays items 410, 420 and 430 indicating at least one or more SNSs can be provided in the mobile terminal 100 on the preview screen 200. If a specific item 410 is selected from the displayed items 410, 420 and 430, the controller 180 performs the recording of the video to meet a video upload requirement of an SNS corresponding to the selected item 410. Further, the controller 180 can control the items 410, 420 and 430 of the SNSs to be displayed by being aligned in order of use frequency in a preset period.

If the SNSs are provided in the mobile terminal 100, the SNS application providing a function of uploading a content including a video to a user account of the corresponding SNS and sharing the uploaded content with other subscribers is already installed on the mobile terminal 100. Further, the video upload requirement includes a play time of an uploadable video, a size of a video file, a resolution ratio of a video, as a format or standard of a video uploadable to a corresponding SNS, etc.

In particular, the controller 180 records the video in a manner that at least one of a play time of a portion or whole part of the currently recorded video, a size of the currently recorded video and a resolution ratio of the currently recorded video meets a video upload requirement of at least one preset SNS.

Referring again to FIG. 2, the controller 180 controls the video, which is recorded to meet the video upload requirement of the preset SNS, to be uploaded to the user account of the SNS (S140). In particular, the controller 180 launches an application of the preset SNS, displays an SNS composing window provided by the launched SNS application, and then attaches a file of the recorded video to the displayed SNS composing window automatically. Subsequently, if a command for uploading an SNS posting having the video field included therein by being composed through the SNS composing window is received from a user, the controller 180 uploads the video file included SNS posting to the user account of the preset SNS through the wireless communication unit 110.

Figure 4:
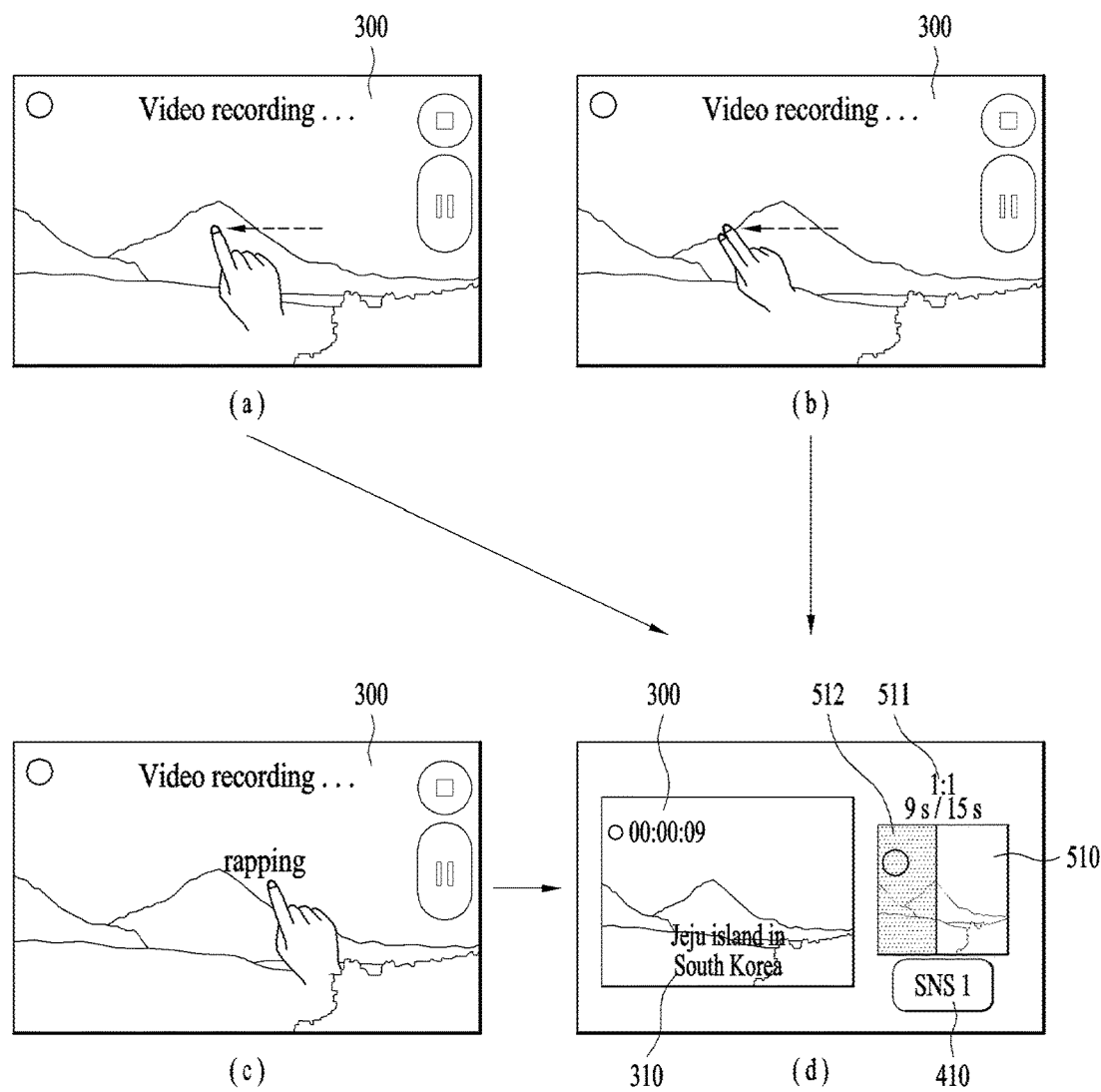

Meanwhile, referring to FIG. 4, as the recording of the video is in progress, if a user's preset touch gesture is applied to a recording screen 300 of the video, the controller 180 can display a first window for showing a first video of an original copy of the ongoing recording and a second window for showing a second video currently recorded to meet the video upload requirement on the touchscreen.

In particular, if the preset touch gesture is applied by touching a first point on the recording screen 300 and then dragging in a first direction is applied (FIG. 4 (a)), the preset touch gesture is applied by touching at least two first and second points on the recording screen 330 and then dragging in the first direction (FIG. 4 (b)), or the preset touch gesture is applied by tapping the recording screen 300 twice at least (FIG. 4 (c)), the controller 180 displays a first window for showing a first video 300 of an original copy of the currently ongoing recording and a second window for showing a second video 510 currently recorded to meet a video upload requirement of the preset first SNS on the touchscreen 151 (FIG. 4 (d)).

Further, the controller 180 can display a first item 410 indicating the first SNS and a requirement information 511 indicating the video upload requirement of the first SNS within or around the second window. Moreover, the controller 180 can display a progressive bar 512, which is provided as a visual effect to indicate a progressive status of a recording of the second video to meet the video upload requirement of the first SNS, on the second window.

For instance, according to the video upload requirement of the first SNS, a play time of the video uploaded to the first SNS should not exceed 15 seconds. Referring to FIG. 4 (d), the progressive 512 is displayed by indicating that the recording of the second video currently proceeds to 9 seconds of total 15 seconds. Moreover, the controller 180 obtains a recording location, at which the first video 300 is currently recorded, from the location information module 115 and can display information 310, which indicates the obtained recording location, on or around the first window.

Subsequently, if the recording of the second video displayed on the second window is completed to meet the video upload requirement of the first SNS, the controller 180 can save the recording completed second video to the memory 170. Further, although the recording of the second video is completed, the controller 180 can continue to perform the recording of the first video of the original copy. Moreover, if the recording of the second video is completed, the controller 180 can end the recording of the first video.

Of course, regarding the difference between the first video and the second video, the first video is a video recorded as an original copy that does not reflect the video upload requirement of the first SNS and the second video is a video recorded to meet the video upload requirement of the first SNS. For instance, the recorded second video shown in FIG. 4 (d) has a total play time of 15 seconds and is the video recorded in a manner that a resolution ratio of a screen is 1:1.

Meanwhile, the first video displayed within the first window may include a preview image that is not actually recorded, and the second video displayed within the second window may be recorded to meet the video upload requirement of the first SNS only. In this instance, the preview image of the original copy is displayed on the first window, while the second video recorded to meet the video upload requirement of the first SNS is displayed on the second window.

Figure 5:
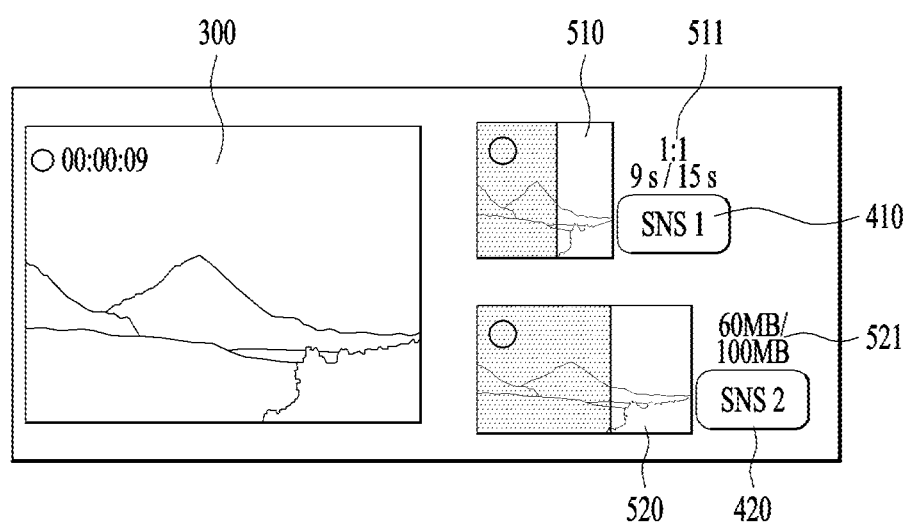

Referring to FIG. 5, if at least two preset SNSs exist, a first window for showing a first video 300 of a currently recorded original copy and a third window for showing a second video 510 currently recorded to meet a video upload requirement of a preset first SNS and a third video 520 currently recorded to meet a video upload requirement of a preset second SNS are displayed on the touchscreen 151.

Further, the controller 180 can display a second item 420 indicating the second SNS and a requirement information 521 indicating the video upload requirement of the first SNS within or around the third window. Moreover, the controller 180 can display a progressive bar, which indicates a progressive status of a recording of the third video 520 to meet the video upload requirement of the second SNS, on the third window.

For instance, as the video upload requirement of the second SNS, a size of a video uploaded to the second SNS should not exceed 100 MB. In addition, FIG. 5 shows that the progressive bar indicating that the recording of the third video 520 is currently performed up to 60 MB of total 100 MB. If the recordings of the first video 300, the second video 510 and the third video 520 are completed, the control unit 180 saves the first video 300, the second video 510 and the third video 520 to the memory 170 by sorting the first video 300, the second video 510 and the third video 520 in the memory 170.

For instance, folders may be provided for SNSs in the memory 170 so that video files can be stored in the corresponding folders, respectively. In particular, the controller 180 can save the first video 300, the second video 510 and the third video 520 to the folder for keeping normal videos, a first SNS folder and a second SNS folder, respectively.

Moreover, in order for a user to easily recognize an SNS, to which the video file can be uploaded, by just looking at a name of the video file, the controller 180 can control a name of the second SNS and a name of the third SNS to be included in a name of a file of the second video 510 and a name of a file of the third video 520, respectively.

Figure 6:
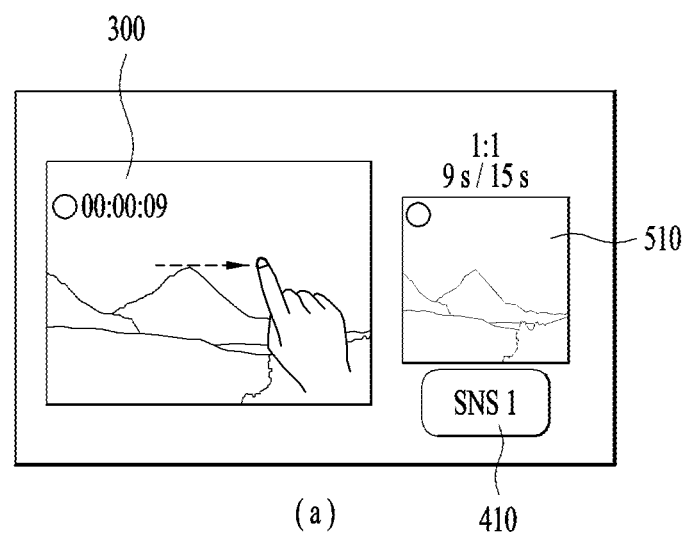
Figure 6:
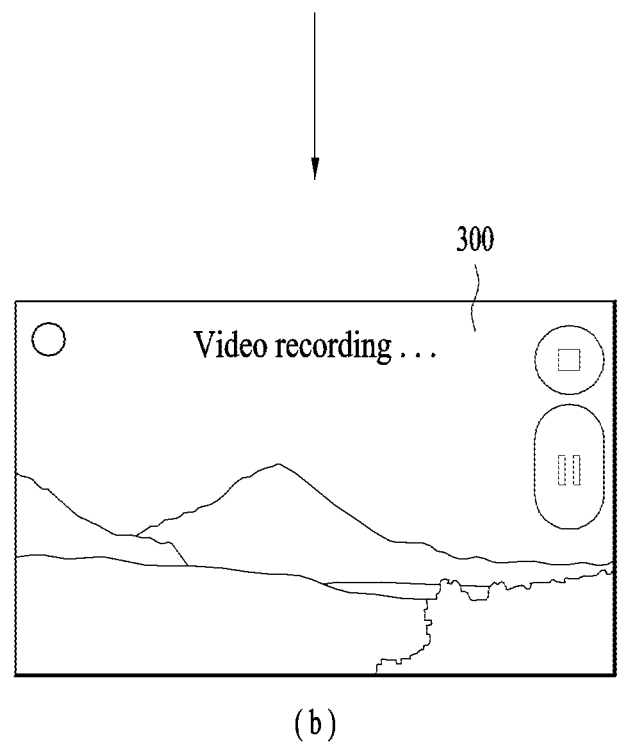

Referring to FIG. 6, if a touch gesture dragged in a second direction opposite to the former drag direction of the touch gesture described with reference to FIG. 4 (a) is input to one of the first window and the second window (FIG. 6 (a)), the controller 180 performs a recording operation of the second video in a background and displays a recording screen of the first video 300 in full screen (FIG. 6 (b)).

Figure 7:
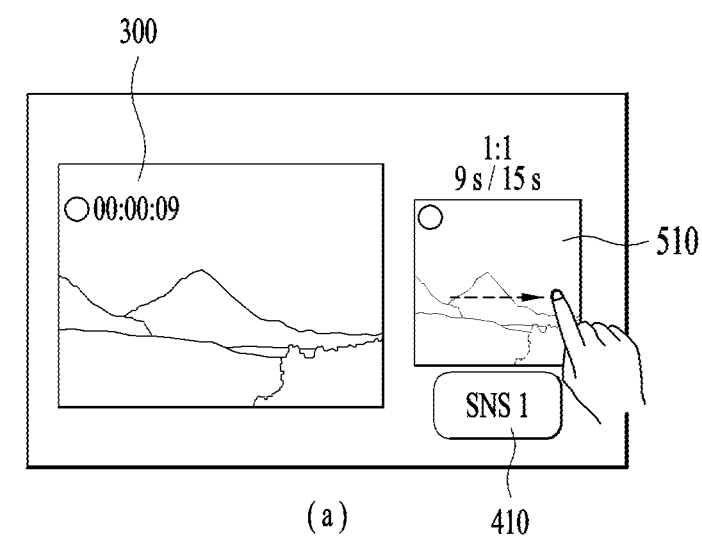
Figure 7:
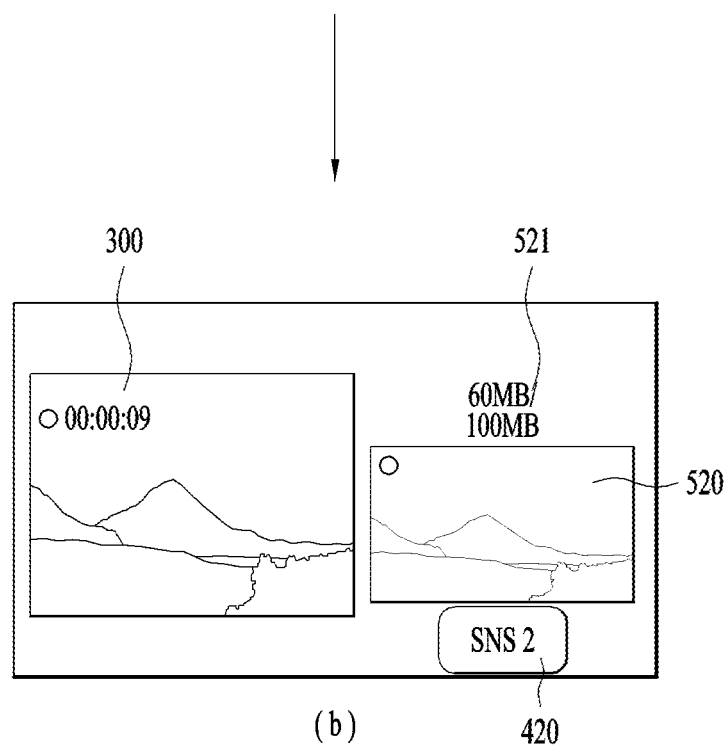

Referring to FIG. 7, if a touch gesture of a preset type is input to the second window (FIG. 7 (a)), the controller 180 can display the third window for displaying the third video 520 recorded to meet the video upload requirement of the preset second SNS instead of the second window (FIG. 7 (b)). Further, the touch gesture of the preset type may include a touch gesture dragged in a specific direction.

Figure 8:
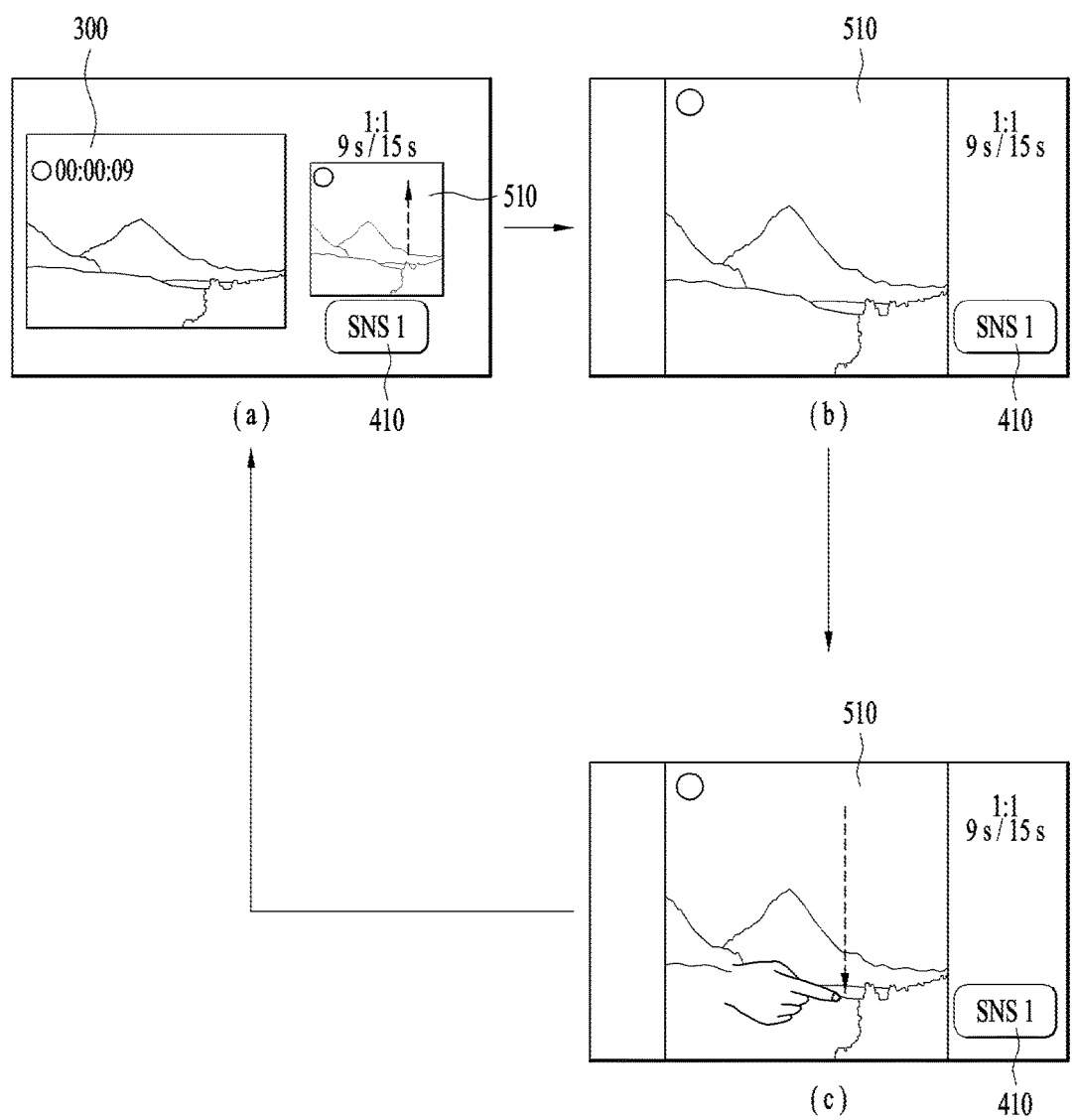

Referring to FIG. 8, if a touch gesture applied by being touched and dragged in a first direction is input to the second window (FIG. 8 (a)), the controller 180 can display the second window in full screen (FIG. 8 (b)). Thereafter, if a touch gesture applied in a second direction opposite to the first direction is input to the second window displayed in full screen (FIG. 8 (c)), the controller 180 can display the first window and the second window on the screen again (FIG. 8 (a)).

Figure 9:
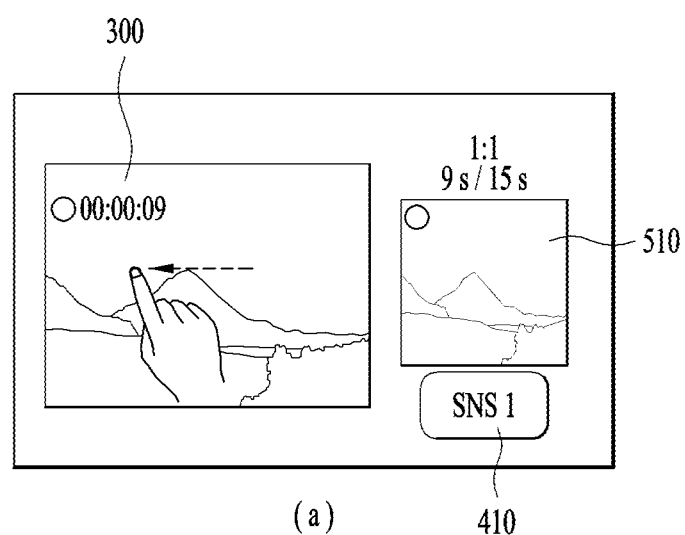
Figure 9:
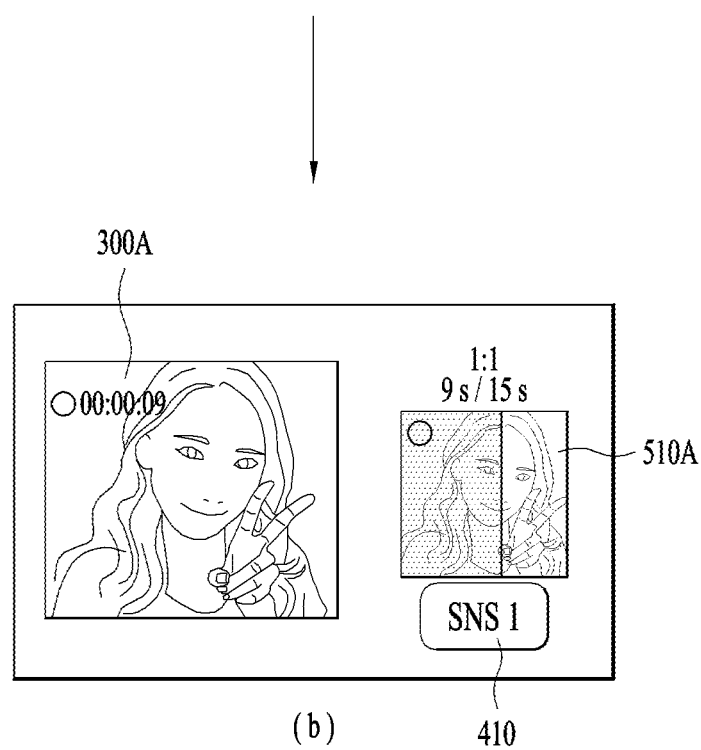

Referring to FIG. 9, the first video 300 and the second video 510 include the video recorded through the first camera 121a installed on a front side of the mobile terminal 100 (or, the second camera 121b installed on a rear side of the mobile terminal 100). While the first video 300 and the second video 510 are displayed on the first window and the second window, respectively, if a touch gesture of a preset type is input to one of the first window and the second window (FIG. 9 (a)), the controller 180 displays a third video 300a currently recorded through the second camera 121b on the first window and can also display a fourth video 510A currently recorded to meet the video upload requirement of the first SNS on the second window (FIG. 9 (b)).

Figure 10:
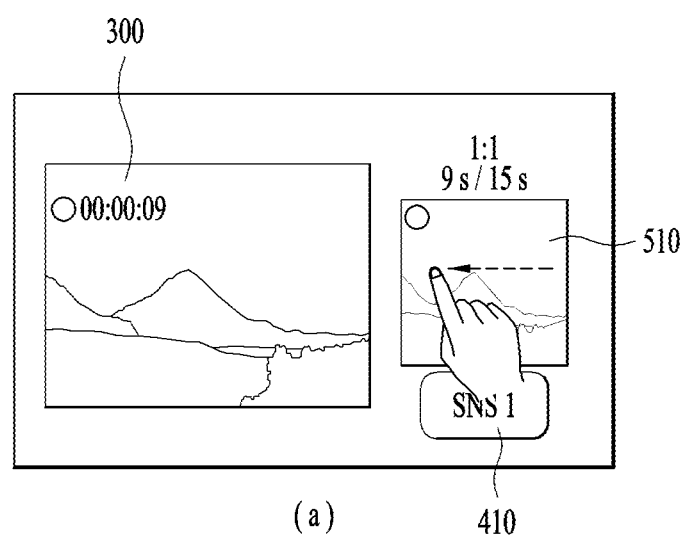
Figure 10:
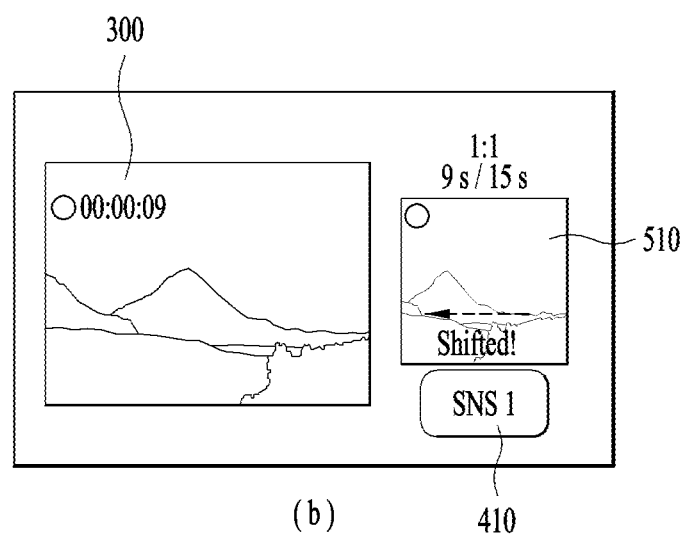
Figure 11:
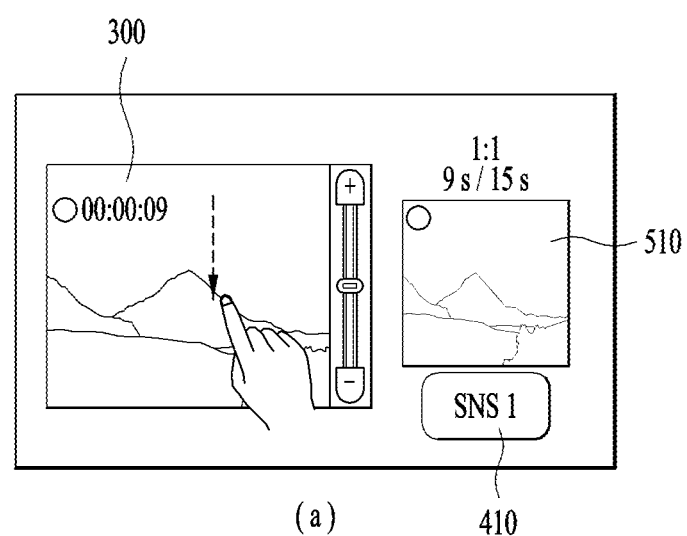
Figure 11:
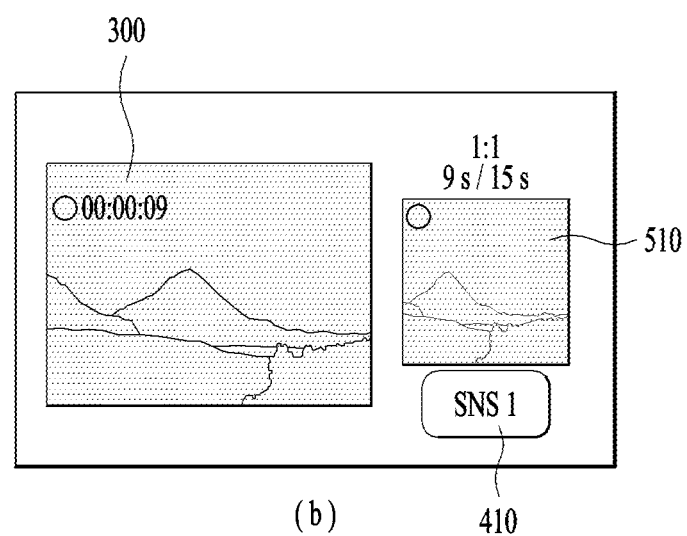

Referring to FIG. 10, if a first point on the second window is touched and a drag is applied in a first distance (FIG. 10 (a)), the controller 180 shifts a scene of the second video 510 by the first distance based on the first video 300 (FIG. 10 (b)). Referring to FIG. 11, if a touch gesture applied by being touched and dragged in a first direction is input to the first window (FIG. 11 (a)), the controller 180 can control an aperture brightness of the camera 121 to be adjusted into a low level in proportion to a distance of the drag applied in the first direction or may adjust a display brightness of each of the first video 300 displayed on the first window and the second video 510 displayed on the second window into a low level in proportion to a distance of the drag applied in the first direction (FIG. 11 (b)).

In particular, as the distance of the drag applied in the first direction increases gradually, the controller 180 can control the aperture brightness of the camera 121 to become dark gradually or may control the display brightness of each of the first video 300 displayed on the first window and the second video 510 displayed on the second window to become dark gradually.

Moreover, if a touch gesture applied by being touched and dragged in a second direction opposite to the first direction is input to the first window, the controller 180 can control an aperture brightness of the camera 121 to be adjusted into a high level in proportion to a distance of the drag applied in the second direction or may adjust a display brightness of each of the first video 300 displayed on the first window and the second video 510 displayed on the second window into a high level in proportion to a distance of the drag applied in the second direction. In particular, as the distance of the drag applied in the second direction increases gradually, the controller 180 can control the aperture brightness of the camera 121 to become bright gradually or may control the display brightness of each of the first video 300 displayed on the first window and the second video 510 displayed on the second window to become bright gradually.

Figure 12:
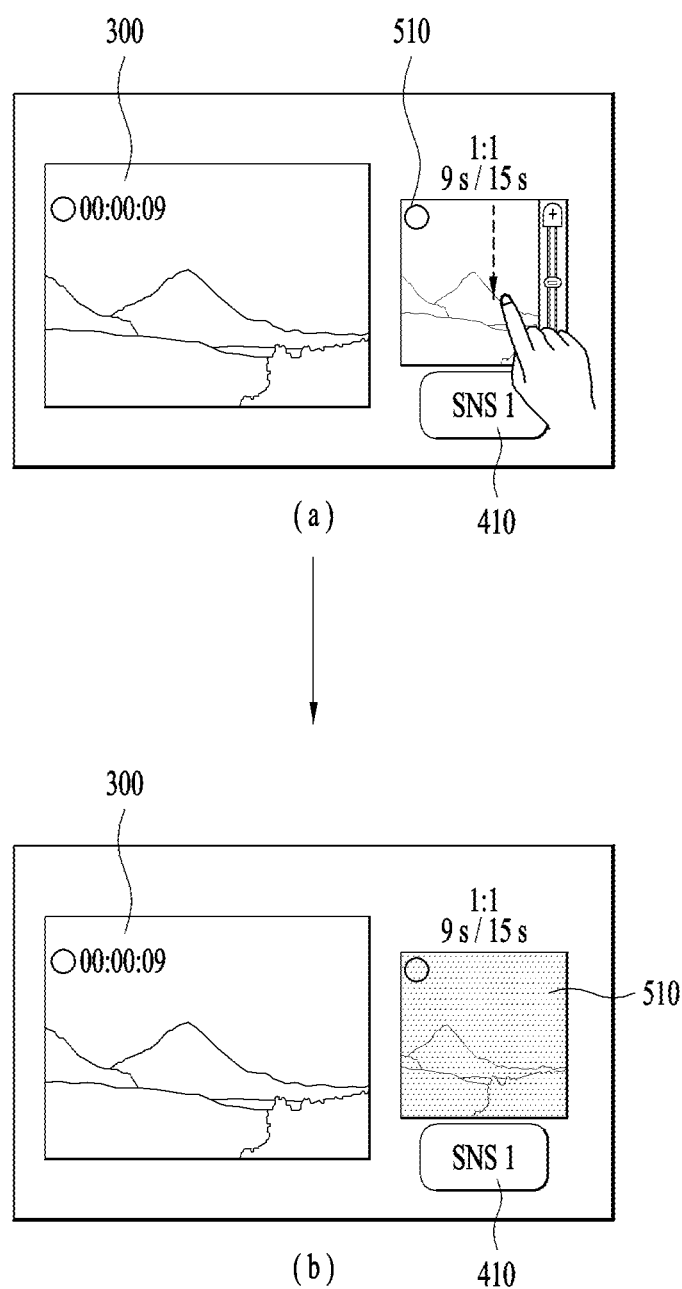

Referring to FIG. 12, if a touch gesture applied by being touched and dragged in a first direction is input to the second window (FIG. 12 (a)), the controller 180 can control a display brightness of the second video 510 displayed within the second window to become dark in proportion to a distance of the drag in the first direction (FIG. 12 (b)).

Moreover, if a touch gesture applied by being touched and dragged in a second direction opposite to the first direction is input to the second window, the controller 180 can control a display brightness of the second video 510 displayed within the second window to become bright in proportion to a distance of the drag in the second direction.

Figure 13:
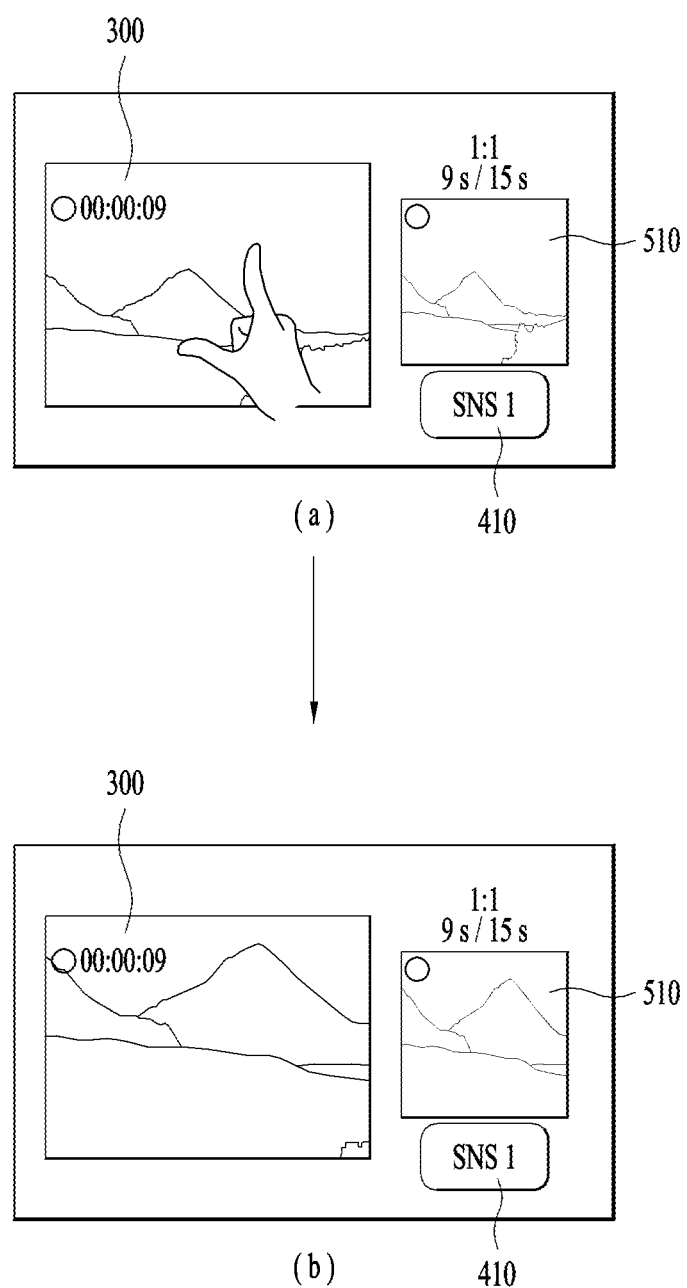

Referring to FIG. 13, if a pinch-out touch is input to the first window (FIG. 13 (a)), the controller 180 zooms in on each of the first video 300 displayed within the first window and the second video 510 displayed within the second window (FIG. 13 (b)). Further, while first and second points on the first window are touched, the pinch-out touch may mean a touch applied by increasing a distance between the first point and the second point gradually. In addition, a pinch-out level (i.e., a level of the pinch-out touch) may mean a level of the increased distance between the first point and the second point.

In particular, if the input pinch-out increases, the controller 180 zooms in on each of the first video 300 and the second video 510 in proportion to the increasing pinch-out. Further, the controller 180 can zoom in using a lens of the camera 121 according to the input pinch-out level and displays the first video 300 and the second video 510 according to the zoom-in. Alternatively, the controller 180 can enlarge each of the first video 300 and the second video 510 by software according to the input pinch-out level.

Moreover, if a pinch-in touch is input to the first window, the controller 180 can zoom out of each of the first video 300 displayed within the first window and the second video 510 displayed within the second window. Further, while first and second points on the first window are touched, the pinch-in touch may mean a touch applied by decreasing a distance between the first point and the second point gradually. In addition, a pinch-in level (i.e., a level of the pinch-in touch) may mean a level of the decreased distance between the first point and the second point.

In particular, if the input pinch-in increases, the controller 180 zooms out of each of the first video 300 and the second video 510 in proportion to the increasing pinch-in. Further, the controller 180 can zoom out using a lens of the camera 121 according to the input pinch-in level and displays the first video 300 and the second video 510 according to the zoom-out. Alternatively, the controller 180 can reduce each of the first video 300 and the second video 510 by software according to the input pinch-in level.

Figure 14:
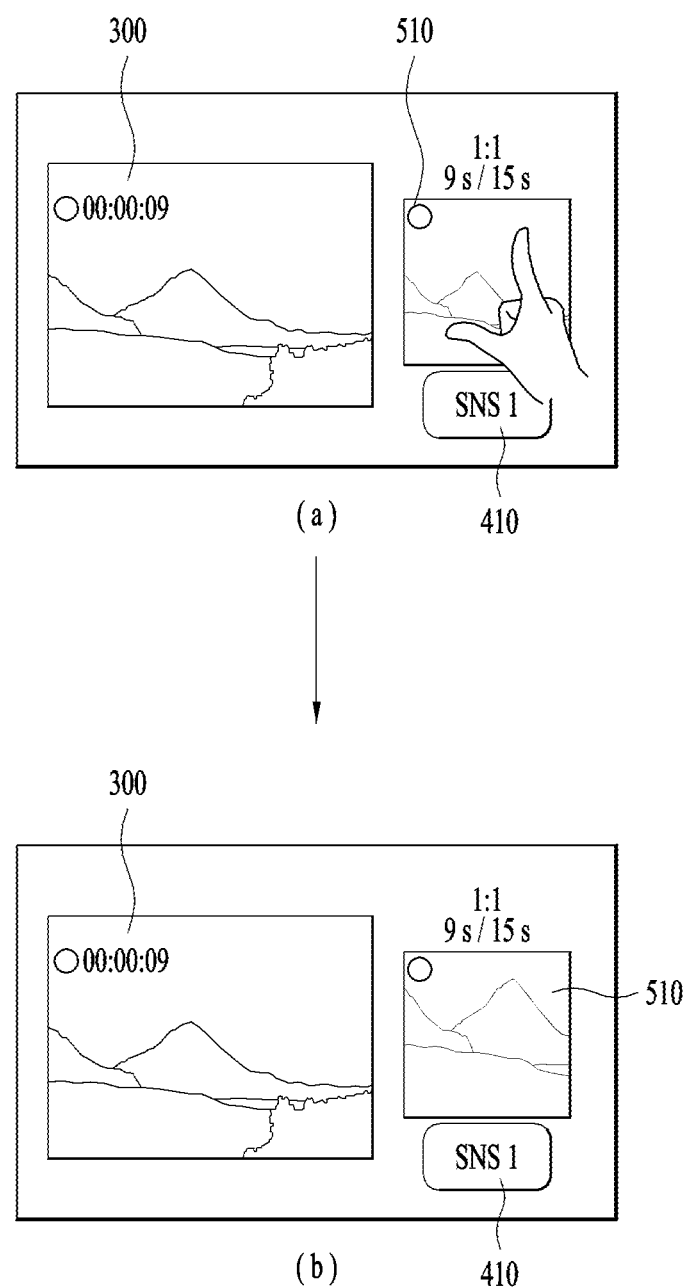

Referring to FIG. 14, if a pinch-out touch is input to the second window (FIG. 14 (a)), the controller 180 zooms in on the second video 510 displayed within the second window (FIG. 14 (b)). Further, the controller 180 can zoom in using a lens of the camera 121 according to the input pinch-out level and displays the second video 510 according to the zoom-in. Alternatively, the controller 180 can enlarge the second video 510 by software according to the input pinch-out level.

Moreover, if a pinch-in touch is input to the second window, the controller 180 zooms out of the second video 510 displayed within the second window. Further, the controller 180 can zoom out using a lens of the camera 121 according to the input pinch-in level and displays the second video 510 according to the zoom-out. Alternatively, the controller 180 can reduce the second video 510 by software according to the input pinch-in level.

Figure 15:
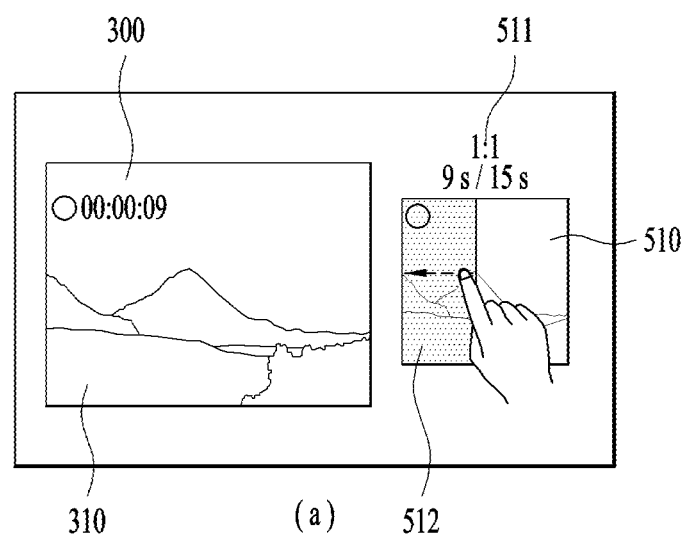
Figure 15:
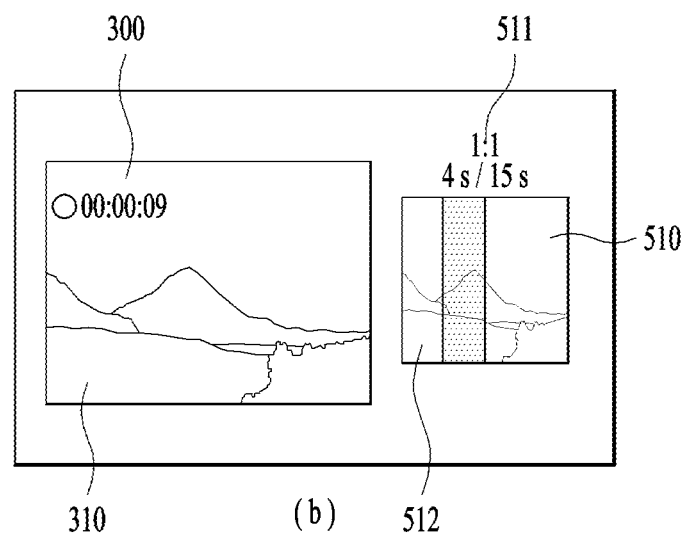

Referring to FIG. 15, while a progressive bar 512 indicating a progressive status of a recording of the second video 510 to meet a video upload requirement 511 of the first SNS is displayed on the second window, if the progressive bar 512 is touched and shifted to a previous timing of the ongoing recording of the second video (FIG. 15 (a)), the controller 180 can delete a quantity ranging from an initial start timing of the recording to the shifted timing from the entire quantity of the recorded second video.

For instance, as shown in FIG. 15 (a), the video upload requirement of the first SNS corresponding to the second video is that a play time of the second video should not exceed 15 seconds. After the second video has been recorded up to '9 seconds', if the progressive bar 512 is shifted to '4 seconds' from '9 seconds', as shown in FIG. 15 (b), the controller 180 deletes the quantity amounting to '0~4 seconds' from the entire quantity amounting to '0~9 seconds' and performs the recording of the second video with the quantity amounting to '4~19 seconds'.

Figure 16:
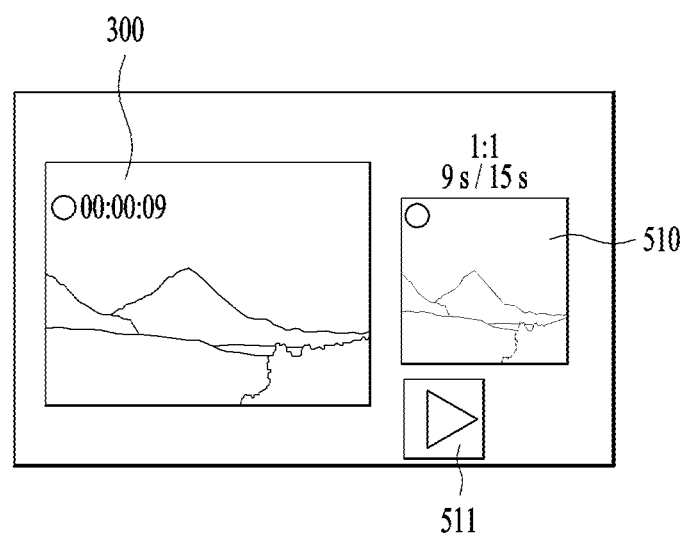

Referring to FIG. 16, if the second video 510 is completely recorded to meet the video upload requirement of the first SNS, the controller 180 saves the second video 510, displays a thumbnail of the second video 510 on a bottom end of the second window, and can then initiate a recording of a third video to meet the video upload requirement of the first SNS.

In particular, since a play time is 15 seconds according to the video upload requirement of the first SNS corresponding to the second video, the controller 180 completely recorded videos displayed on the second window by 15-second units and can then display them as corresponding thumbnails on the bottom end of the second window.

Figure 17:
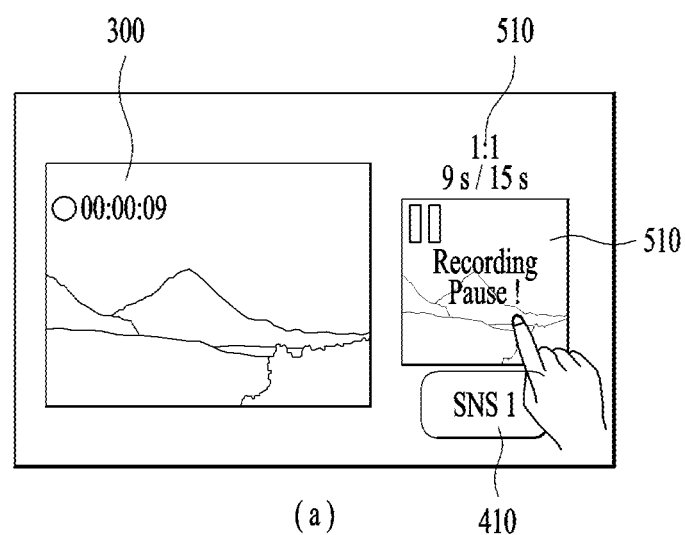
Figure 17:
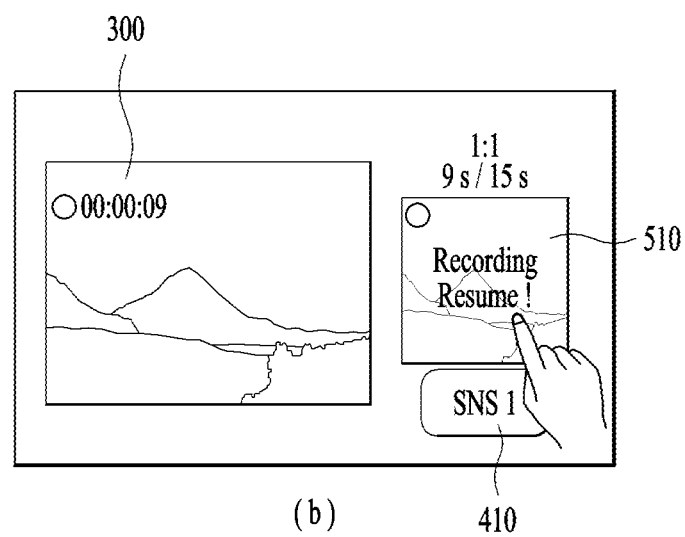
Figure 18:
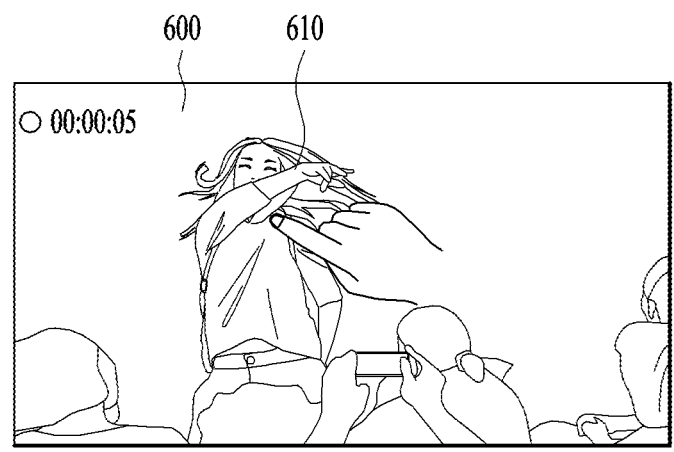
Figure 18:
Figure 18:
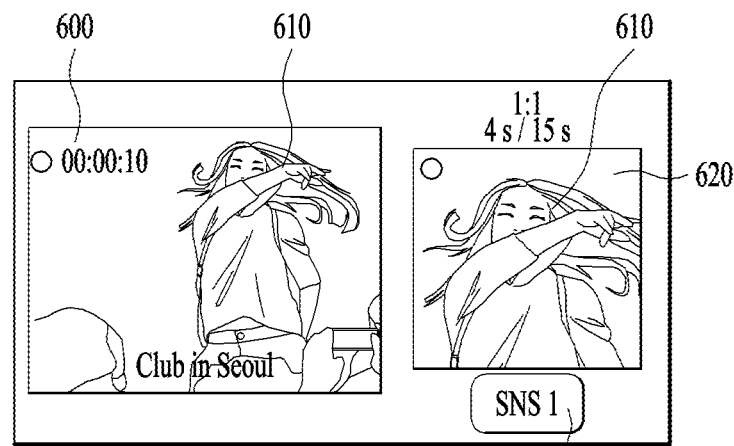

Referring to FIG. 17, if the second window is touched, the controller 180 pauses the recording of the second video 510 displayed on the second window (FIG. 17 (a)). If the second window is touched again the controller 180 resumes the paused recording of the second video 510 (FIG. 17 (b)). Referring to FIG. 18, if a specific subject in a scene of a currently recorded video is selected, the controller 180 performs a tracking focus on the selected subject and can also record the video to meet a video upload requirement of at least one preset SNS.

In particular, referring to FIG. 18 (a), if a subject 610 included in a scene of a first video 600 is selected in the course of recording the first video 600, the controller 180 performs a tracking focus on the selected subject 610. Further, if a region including the subject 610 is designated in the scene of the first video 600, the controller 180 recognizes the subject 610 within the designated region and can then perform the tracking focus on the recognized subject 610. Moreover, if the subject is long touched within the scene of the first video 600, the controller 180 recognizes the long touched subject 610 and can then perform the tracking focus on the recognized subject 610.

Referring to FIG. 18 (b), while the first video 600 of an original copy failing to have the tracking focus applied thereto in the course of recording is displayed on the first window, a second video 620 currently recorded to meet the video upload requirement of the preset first SNS by performing the tracking focus on the selected subject 610 can be displayed on the second window.

Figure 19:
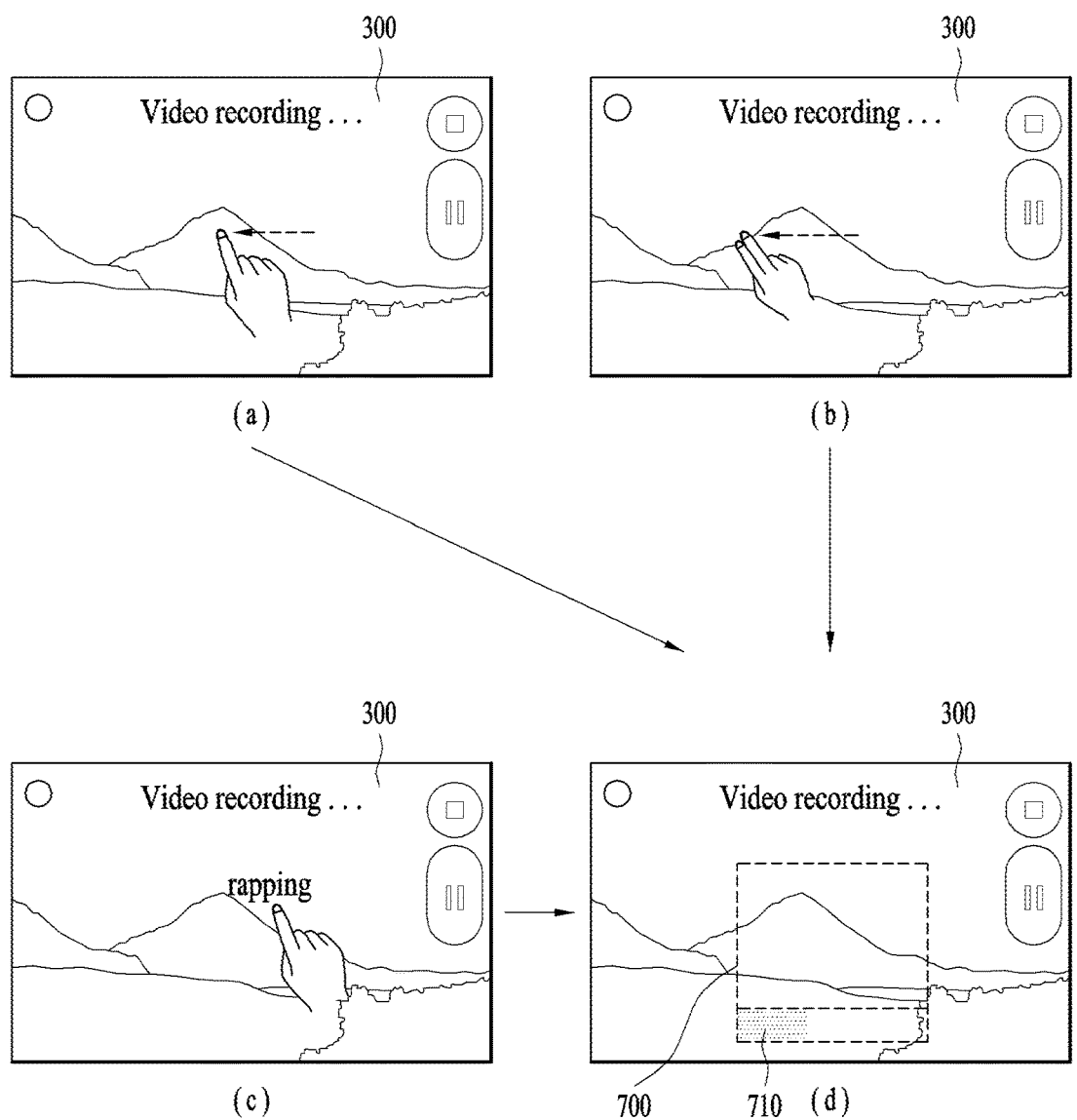
Figure 20:
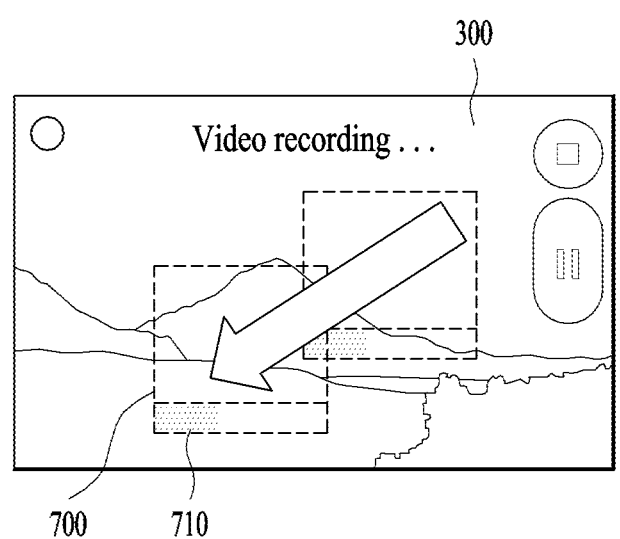
Figure 21:
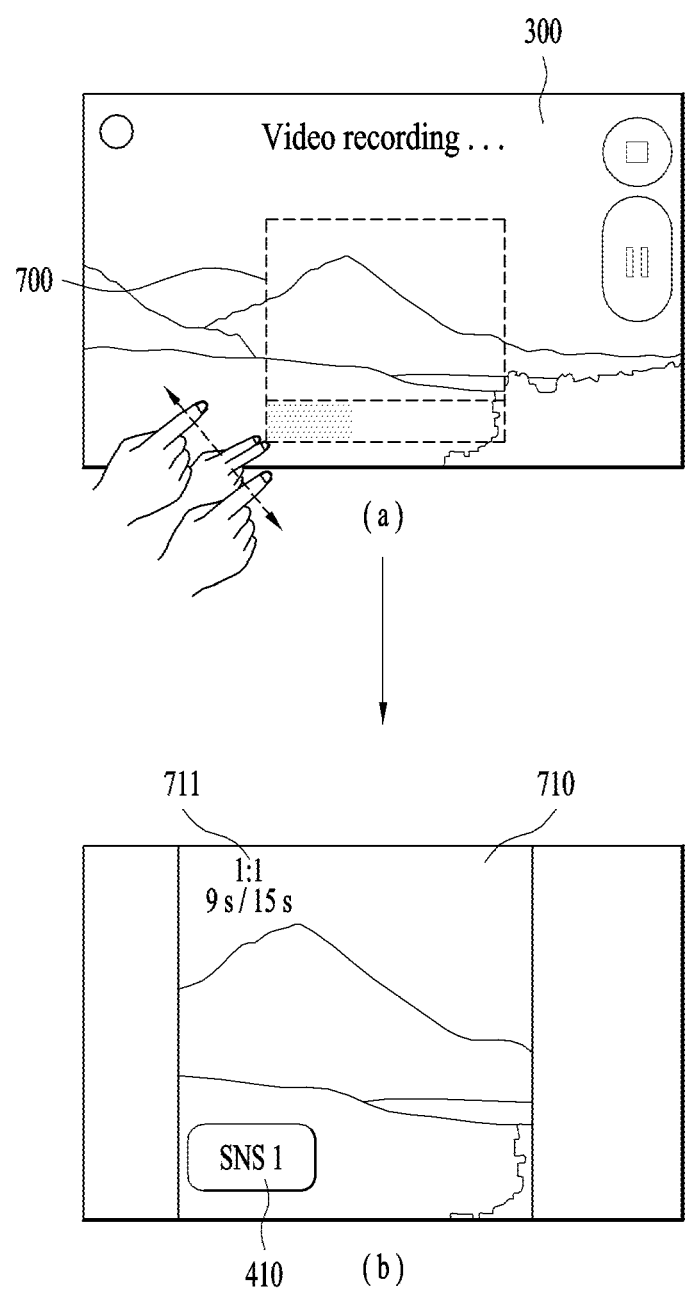

Referring to FIGS. 19 to 21, if a preset touch gesture is input to a recording screen of a first video, the controller 180 can display a guide box indicating a second video, which is currently recorded to meet a video upload requirement of at least one preset SNS, on the recording screen of the first video. Further, a video shown in the guide box is the second video currently recorded to meet the video upload requirement of the SNS, a location of the guide box can be shifted within the recording screen of the first video, and a size of the guide box can be changed.

First of all, if a first point on the recording screen 300 of the first video is touched and dragged in a first direction as the preset touch gesture (FIG. 19 (a)), at least two first and second points on the recording screen 300 are touched and dragged in a 1wst direction as the preset touch gesture (FIG. 19 (b)), or the recording screen 300 is tapped (e.g., tap touched) twice at least (FIG. 19 (c)), the controller 180 displays a guide box 700, which indicates a second video currently recorded to meet a video upload requirement of at least one preset SNS, on the recording screen 300 of the first video (FIG. 19 (d)).

For instance, referring to FIG. 19 (d), the video upload requirement of the SNS includes a resolution ratio of 1:1 and a play time of 15 seconds. In addition, the controller 180 displays the guide box 700, which indicates a real screen size and an actually recorded part of the second video currently recorded to meet the video upload requirement of the SNS, within the recording screen 300 of the first video. Further, the controller 180 can display a progressive bar 710 indicating a progressive status of the recording of the second video within the guide box 700.

Referring to FIG. 20, if the guide box 700 is touched and dragged, the controller 180 moves the guide box 700 to the dragged position and a video shown in the guide box 700 at the guide box shifted position becomes the second video. In particular, if a user shifts the guide box 700, a shooting location of the second video recorded to meet the video upload requirement of the SNS can be changed.

Referring to FIG. 21, if a pinch-out touch is input to a prescribed portion of a guide box 700 (FIG. 21 (a)), the controller 180 can display a second video, which is shown within the guide box 700 by being recorded to meet a video upload requirement of an actually preset SNS, in full screen (FIG. 21 (b)). Further, the controller 180 can display an information 711 indicating the video upload requirement of the SNS and an item 410 indicating the SNS within the second video displayed in full screen.

Figure 22:
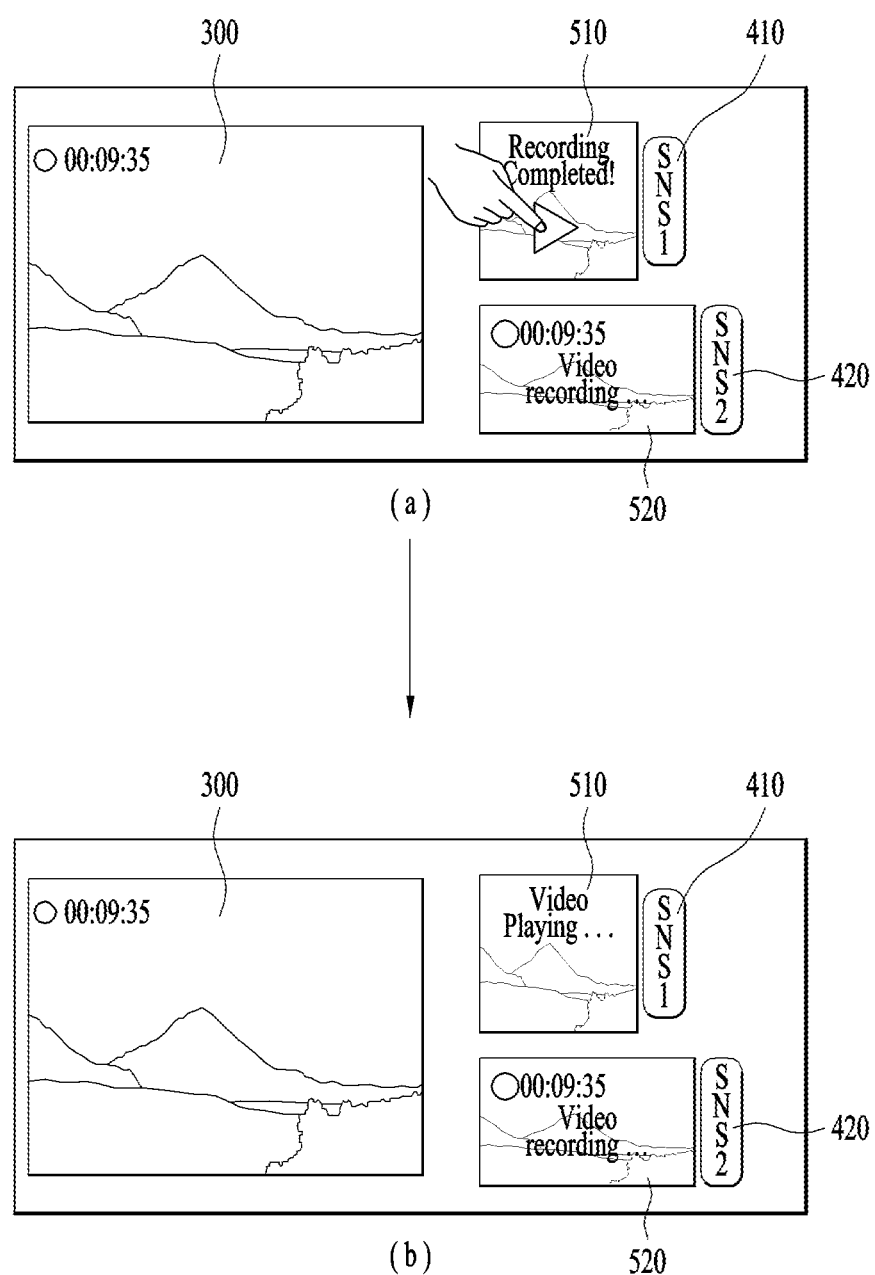

Referring to FIG. 22, while a first window for showing a first video 300 of a currently recorded original copy, a second window for showing a second video 510 having a recording completed to meet a video upload requirement of a preset first SNS and a third window for showing a third video 520 currently recorded to meet a video upload requirement of a preset second SNS are displayed on the touchscreen 151, if the recording completed second video 510 is selected (FIG. 22 (a)), the controller 180 can play and show the recording completed second video 510 on the second window. In particular, before the recording completed second video 510 is uploaded to the first SNS, a user can confirm a corresponding content one more time by playing the second video 510 on the second window.

Figure 23:
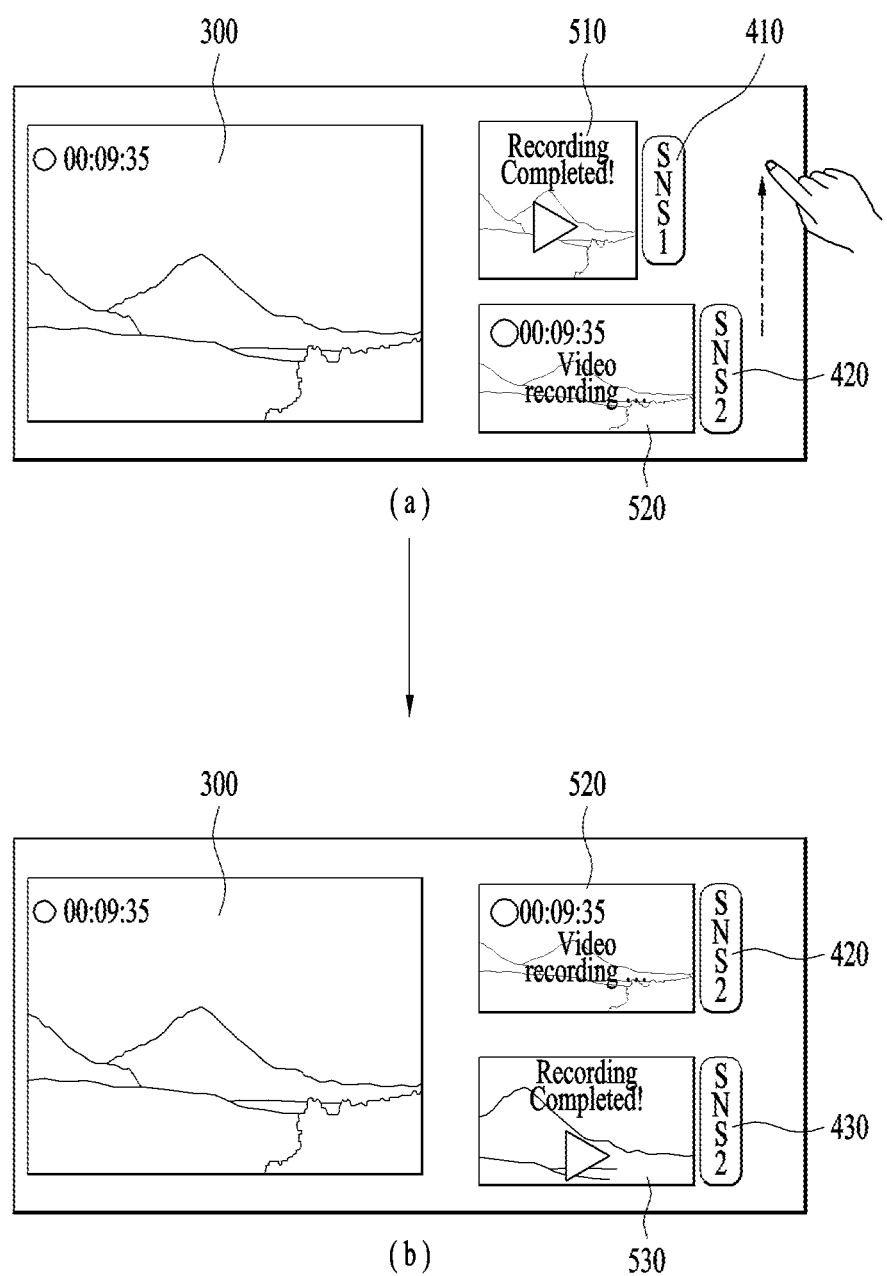

Referring to FIG. 23, while a first window for showing a first video 300 of a currently recorded original copy, a second window for showing a second video 510 having a recording completed to meet a video upload requirement of a preset first SNS and a third window for showing a third video 520 currently recorded to meet a video upload requirement of a preset second SNS are displayed on the touchscreen 151, if a touch gesture for a screen scroll is input to the touchscreen 151 (FIG. 23 (a)), the controller 180 scrolls a screen of the touchscreen 151 in response to the touch gesture (FIG. 23 (b)). In the scrolled screen, the first window, the third window and a fourth window for showing a fourth video 530 currently recorded to meet a video upload requirement of a preset third SNS are included.

Figure 24:
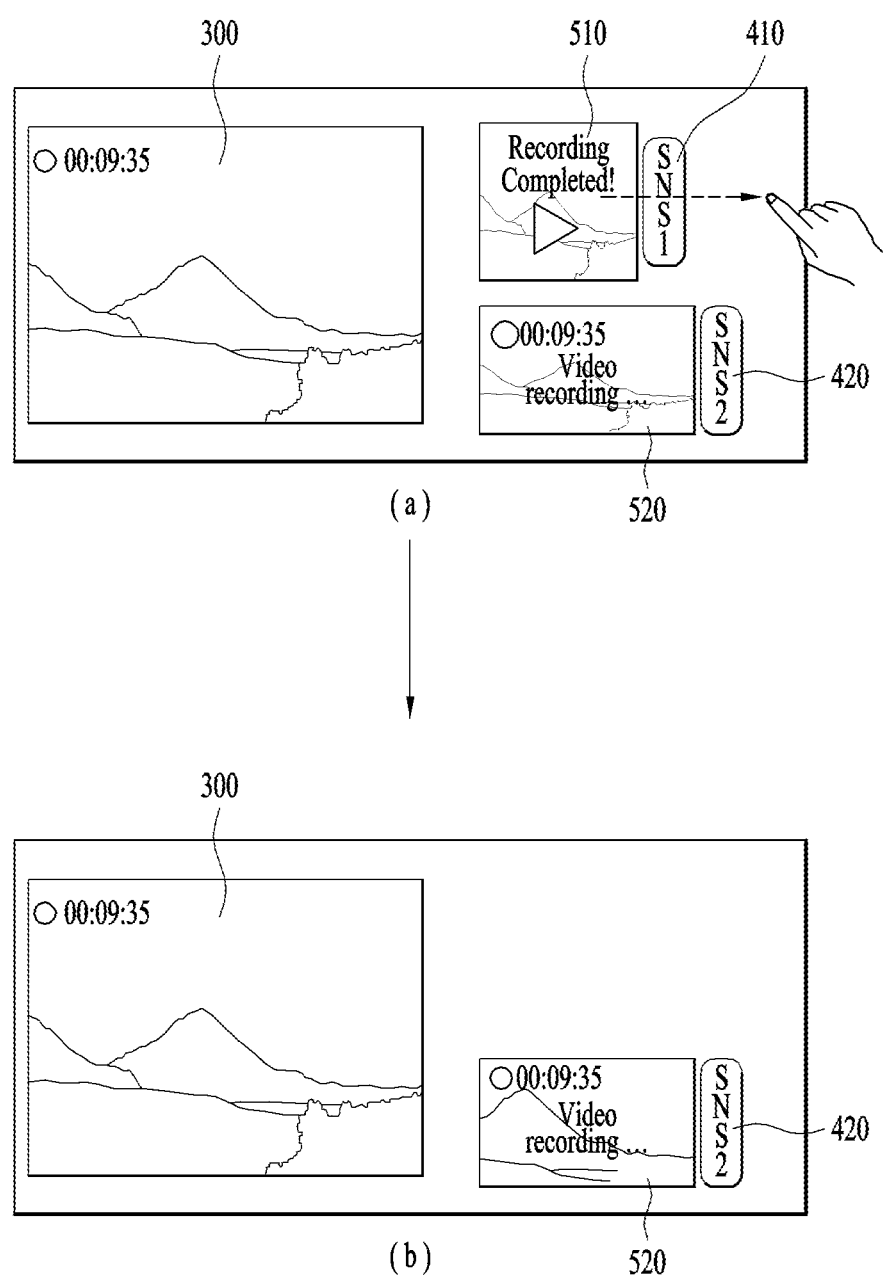

Referring to FIG. 24, while a first window for showing a first video 300 of a currently recorded original copy, a second window for showing a second video 510 having a recording completed to meet a video upload requirement of a preset first SNS and a third window for showing a third video 520 currently recorded to meet a video upload requirement of a preset second SNS are displayed on the touchscreen 151, if the second window is touched and dragged in a specific direction (e.g., a right direction) (FIG. 24 (a)), the controller 180 stops the recording of the second video displayed on the second window and also stops displaying the second window (FIG. 24 (b)).

Figure 25:
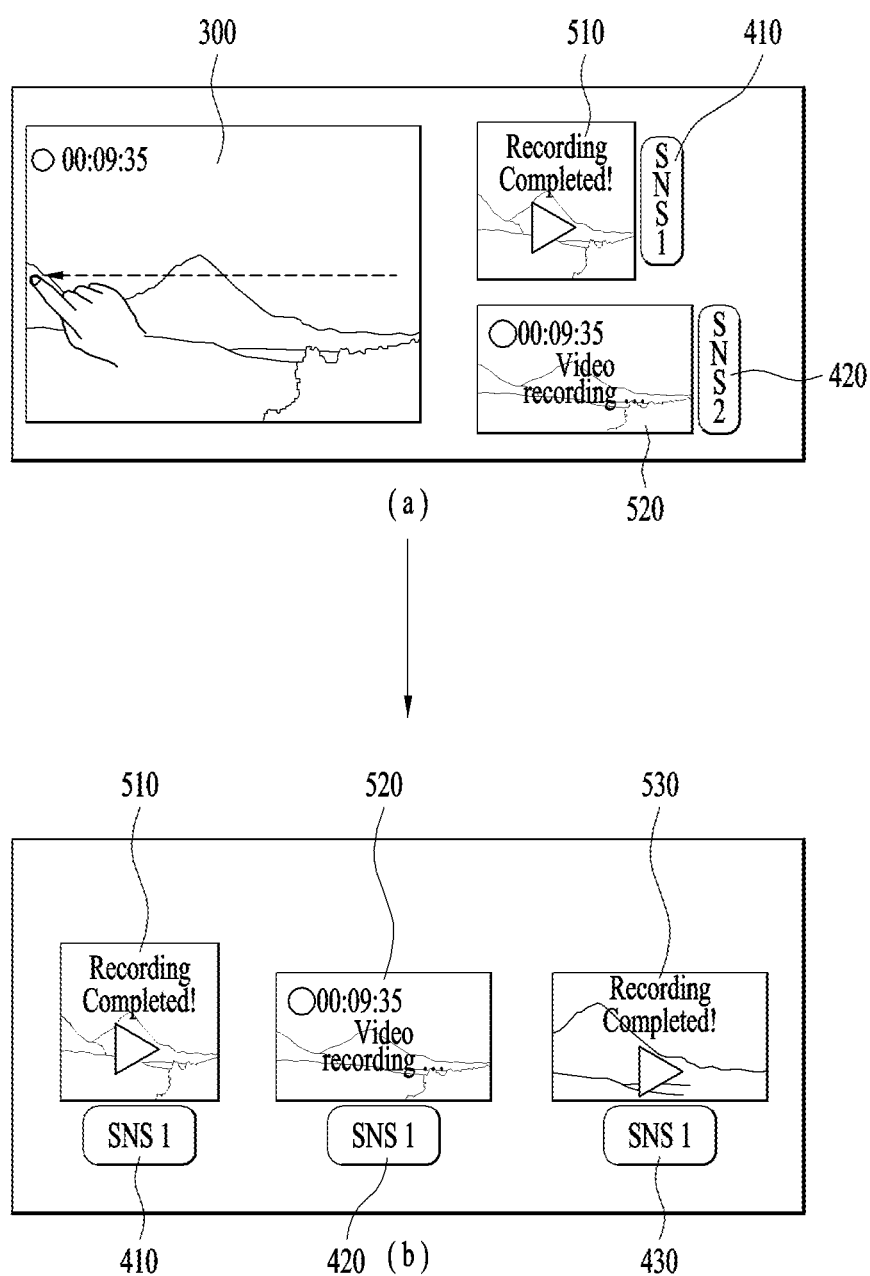

Referring to FIG. 25, while a first window for showing a first video 300 of a currently recorded original copy, a second window for showing a second video 510 having a recording completed to meet a video upload requirement of a preset first SNS and a third window for showing a third video 520 currently recorded to meet a video upload requirement of a preset second SNS are displayed on the touchscreen 151 (FIG. 25 (a)), if the first window is touched and dragged in a specific direction (e.g., a left direction), the controller 180 stops displaying the first window and displays the second window and the third window on the touchscreen 151 only (FIG. 25 (b)). Further, although the first window stops being displayed, a recording operation of the first video may continue in a background.

Figure 26:
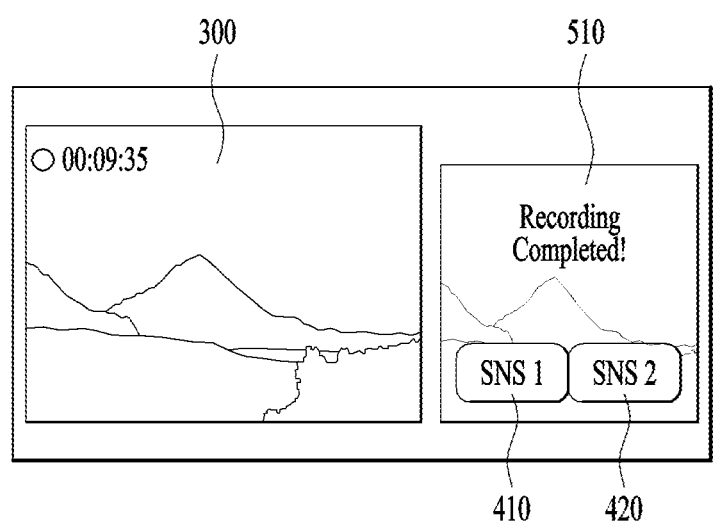

Referring to FIG. 26, if a recording of a second video 510 displayed on a second window is completed and the recording completed second video 510 meets video upload requirements of at least two SNSs including a first SNS and a second SNS, the controller 180 can display a first item 410 indicating the first SNS and a second item 420 indicating the second SNS within the recording completed second video in a manner that the first item 410 and the second item 420 overlap each other.

Figure 27:
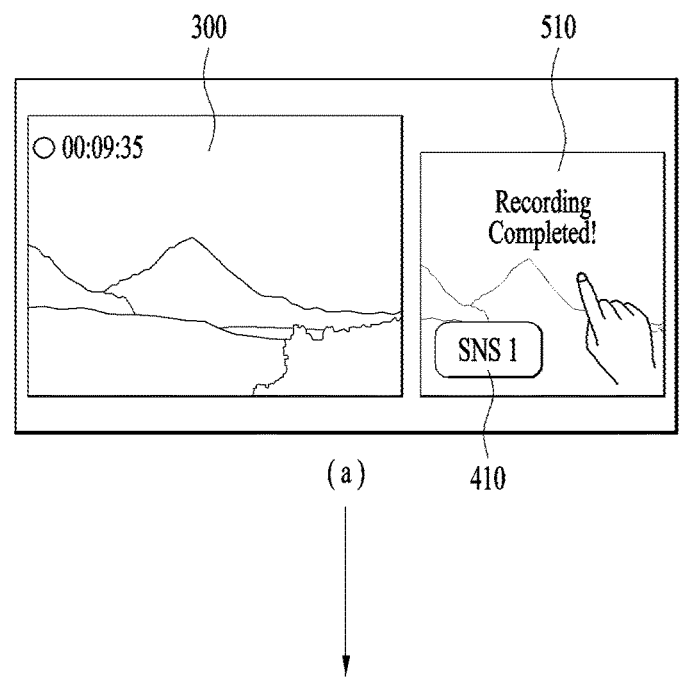
Figure 27:
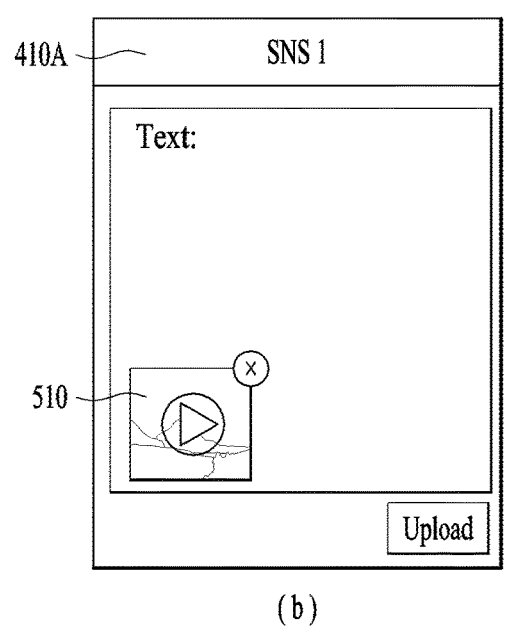

Referring to FIG. 27, after a recording of a second video 510 displayed on a second window is completed to meet a video upload requirement of a first SNS has been completed, if the recording completed second video 510 is selected, a first item 410 indicating the first SNS is selected, or the second window is selected (FIG. 27 (a)), the controller 180 launches an application of the first SNS, displays an SNS composing window provided by the launched application of the first SNS, and then attaches a file of the recording completed second video 510 within the displayed SNS composing window (FIG. 27 (b)).

If a command for uploading an SNS positing composed through the SNS composing window by including the file of the second video 510 is received from a user, the controller 180 can upload the SNS positing including the file of the second video 510 to a user account of the first SNS through the wireless communication unit 110.

Figure 28:
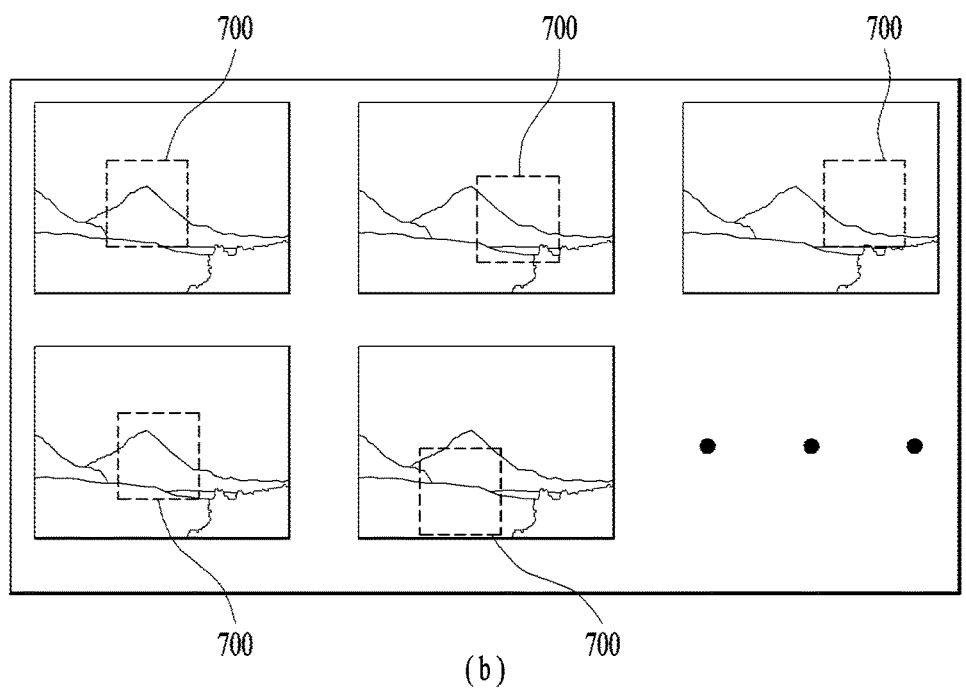

Referring to FIG. 28, after a recording of a first video 300 of an original copy displayed on a first window and a recording of a second video 510 recorded to meet a video upload requirement of a preset SNS have been completed, if the recording completed first video 300 or the first window is selected (FIG. 28 (a)), the controller 180 displays all still images of the recording completed first video 300 on the touchscreen and can display a guide box 700 indicating a part corresponding to the second video 510 on each of the all still images (FIG. 28 (b)).

So far, with reference to FIGS. 2 to 28, the process including recording a video to meet a video upload requirement of a preset SNS in case of performing a video recording and uploading the recorded video to a user account of the SNS is described in detail.

In the following description, a process including if a recording of a video for sharing is completed, converting the recording converted video to meet a video upload requirement of a video upload service selected by a user and uploading the converted video to a user account of the video upload service is described in detail with reference to FIG. 29 and FIG. 30.

Figure 29:
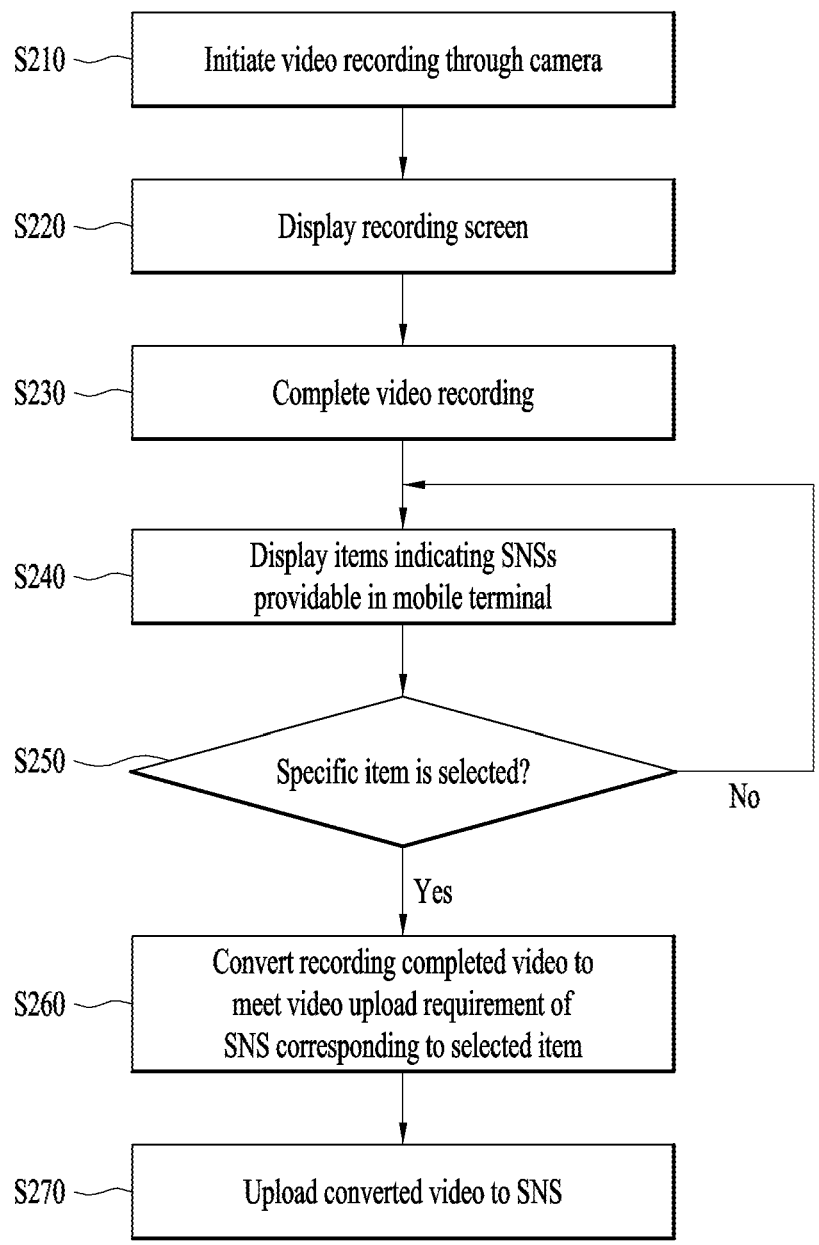
FIG. 29 is a flowchart of a process for uploading a video to SNS by converting a recording completed video to meet a video upload requirement of an SNS selected by a user and then uploading the converted video to the selected SNS according to one embodiment of the present invention.
Figure 30:
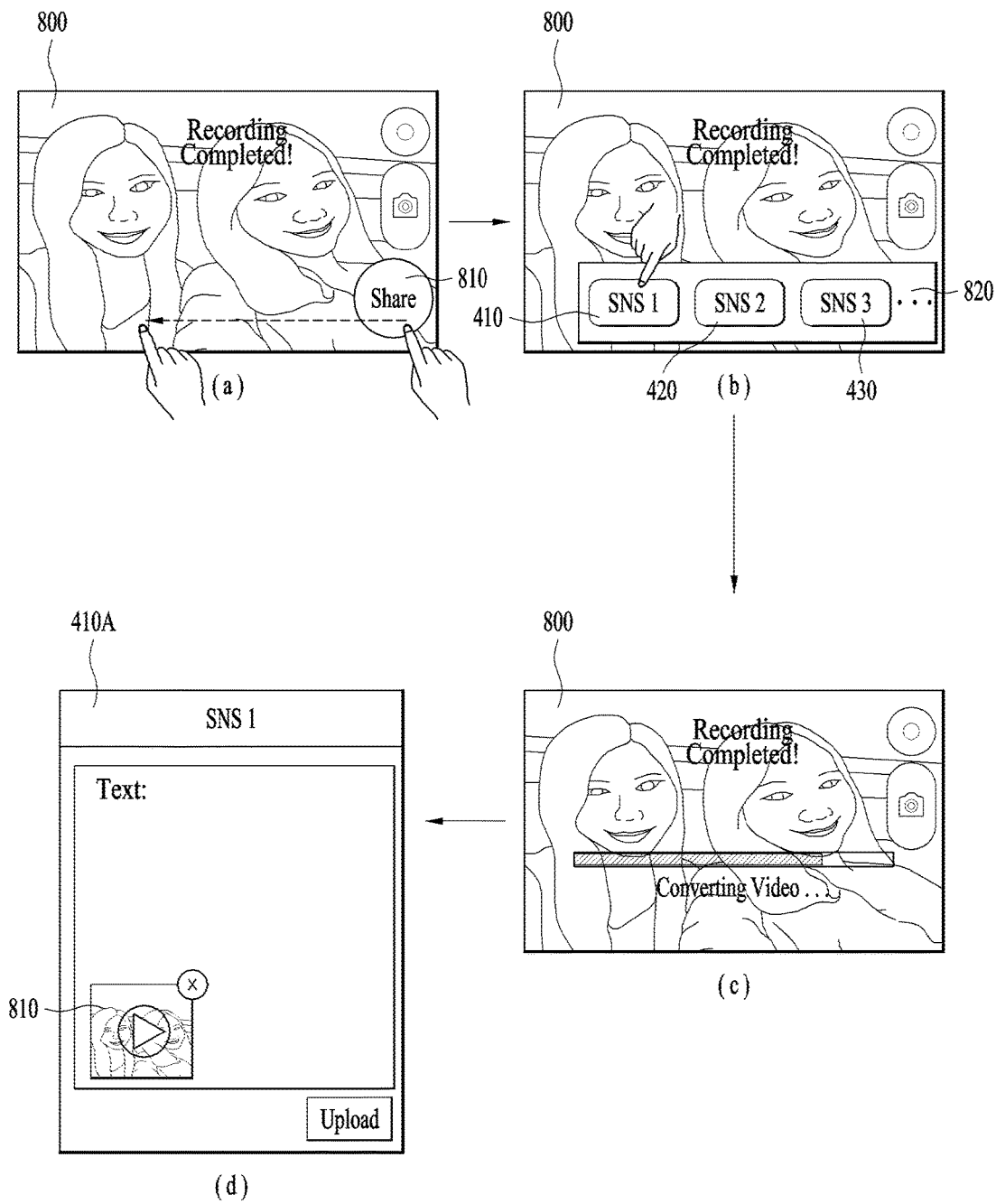
FIG. 30 is a diagram illustrating a process for uploading a video to SNS by converting a recording completed video to meet a video upload requirement of an SNS selected by a user and then uploading the converted video to the selected SNS according to one embodiment of the present invention.

FIG. 29 is a flowchart of a process for uploading a video to SNS by converting a recording completed video to meet a video upload requirement of an SNS selected by a user and then uploading the converted video to the selected SNS according to one embodiment of the present invention, and FIG. 30 is a diagram to describe a process for uploading a video to SNS by converting a recording completed video to meet a video upload requirement of an SNS selected by a user and then uploading the converted video to the selected SNS according to one embodiment of the present invention.

Referring to FIG. 29 and FIG. 30, if the camera 121 is activated, the controller 180 of the mobile terminal 100 displays an image received the camera 121 on a preview screen of the touchscreen 151. Subsequently, if a video recording command is received from a user, the controller 180 initiates a recording of images received from the camera 121 (S210) and displays a recording screen of the currently recorded video (S220).

Thereafter, if the recording of the video is completed (S230), the controller 180 displays items, which are can be provided in the mobile terminal 100, on a recording completed screen of the video (S240). Further, the controller 180 can display items of SNSs by sorting the items by high frequency of use for a preset period of time, or may display items of SNSs previously set by a user only.

If a specific item is selected from the displayed items (S250), the controller 180 converts the recording completed video to meet a video upload requirement of the SNS corresponding to the selected item (S260). Further, the video upload requirement of the SNS may include at least one of a play time of the video, a play size of video and a resolution ratio of the video.

For instance, if the play time of the video upload requirement of the SNS is '15 seconds', the controller 180 converts the recording completed video into a video amounting to a quantity of '15 seconds'. Further, the controller 180 can create a video resulting from extracting the quantity of '15 seconds' from the total quantity of the recording completed video with reference to a recording start point of the recording completed video, a video resulting from extracting the quantity of '15 seconds' from the total quantity of the recording completed video with reference to a recording end point of the recording completed video, or a video resulting from extracting a quantity of '15 seconds' designated by a user from the total quantity of the recording completed video. In another instance, if a play size of the video upload requirement of the SNS is '100 MB', the controller 180 converts the recording completed video into a video amounting to a quantity of '100 MB'. In another instance, if a ratio of resolution of the video upload requirement of the SNS is '1:1', the controller 180 changes the resolution ratio of the recording completed video into '1:1'.

As mentioned in the above description, if the recording completed video is converted to meet the video upload requirement of the SNS corresponding to the selected item, the controller 180 uploads the converted video to a user account of the SNS corresponding to the selected item (S270).

Further, as the uploading operation, the controller 180 displays a composing window of the SNS corresponding to the selected item and then automatically attaches a file of the converted video to the SNS composing window. If a command for uploading an SNS posting, which is composed through the SNS composing window and has the attached video file included therein, is received from the user, the controller 180 uploads the video file included SNS posting to the user account of the SNS through the wireless communication unit 110.

Further, the controller 180 saves the recording completed video (hereinafter named 'first video') and the converted video (hereinafter named 'second video') to the memory 170 respectively in a manner that a name of the SNS is included in a name of a file of the second video. Moreover, if a touch gesture applied by being dragged in a specific direction is input to a recording completed screen of the first video, the controller 180 can display a first window for showing the first video and a second window for showing the second video on a screen of the touchscreen 151. If one of the first window and the second window is selected, the controller 180 can play the video displayed on the selected window.

Referring to FIG. 30 (a), if a recording of a video is completed, the controller 180 displays a share item 810, which is provided to share the recording completed video by uploading the recording completed video to at least one SNS, on a recording completed screen 800 of the recording completed video.

Subsequently, if the share item 610 is touched and dragged in a first direction, as shown in FIG. 30 (b), the controller 180 displays items 410, 420 and 430, which indicate SNSs can be provided in the mobile terminal 100, within a region 820 of the touch drag applied in the first direction. Meanwhile, the controller 180 can control the share item 810 shown in FIG. 30 (a) to be displayed in the same shape of the item indicating an SNS most frequently used by a user among the SNSs.

If the first item 410 is selected from the items, the controller 180 converts the recording completed video to meet a video upload requirement of a first SNS corresponding to the selected first item 410 (FIG. 30 (c)), launches an application of the first SNS corresponding to the selected first item 410, displays an SNS composing window 410A provided by the application of the first SNS, and automatically attaches a file 830 of the recording completed video to the displayed SNS composing window 410A (FIG. 30 (d)).

Thereafter, if a command for uploading an SNS positing, which is composed trough the SNS composing window 710A and contains the video file, is received from a user, the controller 180 can upload the SNS posting containing the video file 830 to a user account of the first SNS through the wireless communication unit 110.

Accordingly, embodiments of the present invention provide various advantages. According to at least one of embodiments of the present invention, when a video is recorded through a camera, the video is recorded to meet a video upload requirement of a preset SNS. Thereafter, when the recorded video is uploaded to a user account of the SNS, the present invention can prevent an upload failure in uploading the recorded video.

According to at least one of embodiments of the present invention, when a video recorded through a camera is uploaded to a user account of an SNS desired by a user, the recorded video is uploaded by being converted to meet a video upload requirement of the SNS, whereby an upload failure can be prevented.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A mobile terminal, comprising:
a wireless communication processor configured to wirelessly communicate with a plurality of video upload services;
a camera;
a touchscreen configured to display a preview image received from the camera before recording a video; and
a controller configured to:
control the touchscreen to display, on the preview image, a plurality of items indicating each of the plurality of video upload services,
control the plurality of items to be displayed by being aligned in order of frequency of use in a preset period,
when one of the plurality of items is selected, control the camera to start recording of a video using the received preview image,
control the camera to record the video to meet a video upload requirement of a video upload service of the plurality of video upload services corresponding to the selected item, and
control the wireless communication processor to upload the recorded video to the video upload service corresponding to the selected item.

2. The mobile terminal of claim 1, wherein the video upload service corresponding to the selected item includes a social network service providing the video upload service corresponding to the selected item to a user account of the mobile terminal.

3. The mobile terminal of claim 1, wherein the video upload requirement is determined by the video upload service corresponding to the selected item and includes at least one of a time quantity, a size or a resolution ratio of recorded video.

4. The mobile terminal of claim 1, wherein the controller is further configured to:
control the touchscreen to display a sharing item for displaying the plurality of items on the preview image before displaying the plurality of items, and
when the sharing item is touched and dragged in a specific direction, control the touchscreen to display the plurality of items on a region corresponding to the specific direction.

5. The mobile terminal of claim of claim 1, wherein the controller is further configured to:
execute an application corresponding to the video upload service corresponding to the selected item,
control the touchscreen to display a composing window provided by the executed application,
automatically attach a file of the recorded video to the display composing window, and
when a command for uploading a positing including the file of the recorded video is received, control the wireless communication processor to upload the file of the recorded video included in the posting to the video upload service corresponding to the selected item.

6. A method of recording a video on a mobile terminal, the method comprising:
providing wireless communication with a plurality of video upload services via a wireless communication processor of the mobile terminal;
displaying, via a touchscreen, a preview image received from a camera of the mobile terminal before recording a video;
displaying, on the preview image, a plurality of items indicating each of the plurality of video upload services;
controlling the plurality of items to be displayed by being aligned in order of frequency of use in a preset period;
when one of the plurality of items is selected, controlling the camera to start recording of a video using the received preview image;
controlling the camera to record the video to meet a video upload requirement of a video upload service of the plurality of video upload service corresponding to the selected item; and
uploading the recorded video to the video upload service corresponding to the selected item via the wireless communication processor.

7. The method of claim 6, wherein the video upload service corresponding to the selected item includes a social network service providing the video upload service corresponding to the selected item to a user account of the mobile terminal.

8. The method of claim 6, wherein the video upload requirement is determined by the video upload service corresponding to the selected item and includes at least one of a time quantity, a size or a resolution ratio of recorded video.

9. The method of claim 6, wherein the displaying the plurality of items comprises:
displaying a sharing item for displaying the plurality of items on the preview image before displaying the plurality of items; and
when the sharing item is touched and dragged in a specific direction, displaying the plurality of items on a region corresponding to the specific direction.

10. The method of claim 6, wherein the uploading the recorded video comprises:
executing an application corresponding to the video upload service corresponding to the selected item;
displaying a composing window provided by the executed application;
automatically attaching a file of the recorded video to the display composing window; and
when a command for uploading a positing including the file of the recorded video is received, uploading the file of the recorded video included in the posting to the video upload service corresponding to the selected item.

* * * * *